US012745172B2

(12) United States Patent
Marwah et al.

(10) Patent No.: US 12,745,172 B2
(45) Date of Patent: Sep. 22, 2026

(54) EFFICIENT POWER SAVE SCHEME FOR SOFT ACCESS POINTS

(71) Applicant: QUALCOMM INCORPORATED, San Diego, CA (US)

(72) Inventors: Gurpreet Marwah, Hyderabad (IN); Sriman Miryala, Hyderabad (IN); Benjamin James Campbell, Bury St Edmunds (GB); Hemant Gupta, Hyderabad (IN); Santhi Swaroop Golti, Hyderabad (IN)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 18/729,477

(22) PCT Filed: May 18, 2022

(86) PCT No.: PCT/US2022/029820
§ 371 (c)(1),
(2) Date: Jul. 16, 2024

(87) PCT Pub. No.: WO2023/172277
PCT Pub. Date: Sep. 14, 2023

(65) Prior Publication Data

US 2025/0106762 A1 Mar. 27, 2025

(30) Foreign Application Priority Data

Mar. 11, 2022 (IN) ............................ 202241013335

(51) Int. Cl.
*H04W 52/02* (2009.01)
*H04W 36/14* (2009.01)
(Continued)

(52) U.S. Cl.
CPC ... *H04W 52/0216* (2013.01); *H04W 36/1446* (2023.05); *H04W 52/0229* (2013.01); *H04W 84/12* (2013.01)

(58) Field of Classification Search
None
See application file for complete search history.

(56) References Cited

U.S. PATENT DOCUMENTS

| | | | | |
|---|---|---|---|---|
| 8,155,695 B2 * | 4/2012 | Wang | H04W 72/1215 | 455/553.1 |
| 8,817,682 B1 * | 8/2014 | Goel | H04W 52/0206 | 370/311 |

(Continued)

OTHER PUBLICATIONS

International Search Report and Written Opinion—PCT/US2022/029820—ISA/EPO—Nov. 25, 2022.

*Primary Examiner* — Tuan A Tran
(74) *Attorney, Agent, or Firm* — Holland & Hart LLP

(57) ABSTRACT

This disclosure describes techniques for allowing a wireless device and a peripheral device to enter a sleep state while maintaining an active WLAN link between the wireless device and the peripheral device. In some implementations, the wireless device operates as a STA associated with a WLAN while also operating as a softAP. The wireless device selects a sleep state beacon interval based on a handover request, and obtains a next sleep state TBTT based on the sleep state beacon interval and a TSF value of the wireless device. The wireless device sends a message to the peripheral device over the Bluetooth connection, the message indicating the next sleep state TBTT and the sleep state beacon interval, and transmits one or more beacon frames to the peripheral device over the WLAN link during the sleep state based on the next sleep state TBTT and the sleep state beacon interval.

32 Claims, 18 Drawing Sheets

(51) Int. Cl.

| | |
|---|---|
| ***H04W 56/00*** | (2009.01) |
| ***H04W 84/12*** | (2009.01) |

(56) References Cited

U.S. PATENT DOCUMENTS

| | | | | |
|---|---|---|---|---|
| 9,363,757 | B2 * | 6/2016 | Takahashi | H04W 76/14 |
| 9,414,311 | B2 * | 8/2016 | Kella | H04W 52/0216 |
| 9,531,524 | B2 * | 12/2016 | Kim | H04L 5/0078 |
| 9,769,752 | B2 * | 9/2017 | Hayes | H04L 67/1046 |
| 9,958,933 | B2 * | 5/2018 | Lingutla | G06F 1/3287 |
| 10,098,056 | B2 * | 10/2018 | Gupta | H04W 48/14 |
| 10,278,128 | B2 * | 4/2019 | Takahashi | H04W 52/0261 |
| 10,440,619 | B2 * | 10/2019 | Taneja | H04W 36/0066 |
| 10,492,155 | B2 * | 11/2019 | Chhabra | H04L 67/104 |
| 10,564,708 | B2 * | 2/2020 | Lingutla | G06F 1/3206 |
| 10,681,632 | B2 * | 6/2020 | Ramamurthy | H04W 52/0229 |
| 10,952,139 | B2 * | 3/2021 | Asterjadhi | H04W 72/21 |
| 11,382,041 | B2 * | 7/2022 | Liu | H04W 52/0258 |
| 11,659,466 | B2 * | 5/2023 | Avadhanam | H04W 36/304 370/331 |
| 12,101,671 | B2 * | 9/2024 | Li | H04W 52/0229 |
| 12,219,476 | B2 * | 2/2025 | Huang | H04W 52/0229 |
| 12,382,330 | B2 * | 8/2025 | Teyeb | H04W 24/10 |
| 12,452,788 | B2 * | 10/2025 | Kim | H04W 52/0235 |
| 2014/0119252 | A1 | 5/2014 | Kella et al. | |
| 2016/0330635 | A1 | 11/2016 | Chhabra et al. | |

* cited by examiner

EFFICIENT POWER SAVE SCHEME FOR SOFT ACCESS POINTS

CROSS-REFERENCE TO RELATED APPLICATION

The present application is a 371 national stage filing of International PCT Application No. PCT/US2022/029820 by MARWAH et al. entitled "EFFICIENT POWER SAVE SCHEME FOR SOFT ACCESS POINTS," filed May 18, 2022; and claims priority to Indian Patent Application number 202241013335 by INVENTOR et al. entitled "EFFICIENT POWER SAVE SCHEME FOR SOFT ACCESS POINTS," filed Mar. 11, 2022, each of which is assigned to the assignee hereof, and each of which is expressly incorporated by reference in its entirety herein.

TECHNICAL FIELD

This disclosure relates generally to wireless communications, and more specifically, to transmitting data to a Bluetooth-enabled device over a Wi-Fi channel.

DESCRIPTION OF THE RELATED TECHNOLOGY

A wireless personal area network (PAN) is a short-range wireless network typically used to interconnect various personal devices, sensors, appliances, and/or IoT devices. For example, PANs based on communication protocols such as Bluetooth® (BT) or Zigbee® may provide wireless connectivity to peripheral devices within a specific distance (such as 5 meters, 10 meter, 20 meters, 100 meters, etc.) of the user.

Bluetooth is a short-range wireless communication protocol that supports a PAN between a central device (such as a host device) and at least one peripheral device (such as a client device). Power consumption associated with Bluetooth communications may render Bluetooth impractical in certain applications. To reduce power consumption, Bluetooth® Low Energy (BLE) was developed and adopted in various applications in which data transfers occur relatively infrequently. The BLE protocol exploits the infrequent transfer of data by using a low duty cycle operation, and by placing one or both the central device and the peripheral device(s) into a sleep mode between data transmissions, thereby conserving power. While traditional Bluetooth and BLE offer certain advantages, there exists a need for further improvements in Bluetooth and BLE technology. For example, traditional Bluetooth and BLE have limited range, have limited data capacity throughput, and are susceptible to interference from other devices communicating in the same frequency band (such as Wi-Fi communications).

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description presented later.

One innovative aspect of the subject matter described in this disclosure can be implemented as a method for wireless communication by a wireless device. In some implementations, the method includes operating the wireless device as a wireless station (STA) associated with a wireless local area network (WLAN) while also operating the wireless device as a software-enabled access point (softAP) that is paired with a peripheral device over a Bluetooth connection and associated with the peripheral device via a WLAN link. The method includes obtaining a request to handover communications from the WLAN link to the Bluetooth connection, and selecting a sleep state beacon interval based on the handover request, the sleep state beacon interval being longer than a beacon interval associated with the WLAN. The method includes obtaining a next sleep state target beacon transmission time (TTBT) based on the sleep state beacon interval and a timing synchronization function (TSF) value of the wireless device, and entering the softAP into a sleep state while maintaining the WLAN link in an active state. The method includes sending a first message to the peripheral device over the Bluetooth connection, the first message indicating the next sleep state TBTT and the sleep state beacon interval. The method includes transmitting one or more beacon frames to the peripheral device over the WLAN link during the sleep state based on the next sleep state TBTT and the sleep state beacon interval.

In some instances, the sleep state beacon interval may be an order of magnitude longer than the beacon interval associated with the WLAN. In some aspects, the WLAN link includes one or more wireless channels in a 2.4 GHz frequency band, a 5 GHz frequency band, or a 6 GHz frequency band. In other aspects, the WLAN link includes at least one of a peer-to-peer (P2P) link, a tunneled direct-link setup (TDLS) link, a Wi-Fi Direct link, a link associated with a Group Owner (GO), or a link associated with a Neighborhood Area Network (NAN).

The method also includes receiving one or more null frames from the peripheral device over the WLAN link, each null frame being responsive to a respective beacon frame. In some instances, each beacon frame includes a traffic indication map (TIM) bit set to 1, and each null frame includes a power management (PM) bit set to 0.

In various implementations, the method also includes transmitting a first ping request to the peripheral device over the WLAN link during the sleep state, the first ping request including a first transmission control protocol/internet protocol (TCP/IP) frame and a first Bluetooth header encapsulated within a first WLAN-compliant packet. In some instances, the method may also include receiving a ping response from the peripheral device over the WLAN link during the sleep state, the ping response being responsive to the first ping request and including a second TCP/IP frame and a second Bluetooth header encapsulated within a second WLAN-compliant packet. In other instances, the method may also include transmitting a second ping request to the peripheral device over the WLAN link during the sleep state based on an absence of a ping response from the peripheral device, the second ping request including a third TCP/IP frame and a third Bluetooth header encapsulated within a third WLAN-compliant packet. In some aspects, the transmission of the second ping request is offset in time from the transmission of the first ping request by the sleep state beacon interval.

In some implementations, the method may also include obtaining an indication of an active target wake time (TWT) session with the peripheral device over the WLAN link, and tearing down the TWT session prior to sending the first message to the peripheral device over the Bluetooth connection. In other implementations, the method may also include obtaining a request to handover communications from the Bluetooth connection to the WLAN link, obtaining a next TBTT based on the beacon interval associated with the WLAN and the TSF value of the wireless device, exiting the softAP from the sleep state, and sending a second message to the peripheral device over the Bluetooth connection, the second message indicating the next TBTT and the beacon interval associated with the WLAN. In some other implementations, the method may also include sending a third message to the peripheral device over the Bluetooth connection, the third message indicating one or more TWT parameters, receiving a TWT request from the peripheral device over the WLAN link, the TWT request being responsive to the third message, and establishing the TWT session based at least in part on the TWT request.

In some other implementations, the peripheral device includes a first earbud and a second earbud, each of the first earbud and the second earbud being associated with the softAP, and each of the first earbud and the second earbud being paired with the softAP via the Bluetooth connection. In some instances, the method may also include returning the softAP to the sleep state after sending the second message, obtaining a notification that the first earbud is associated with the softAP and the second earbud is not associated with the softAP, waking the softAP from the sleep state without changing the next TBTT or the beacon interval, receiving a connect message from the second earbud over the Bluetooth connection, and associating with the second earbud without disassociating from the first earbud based at least in part on the connect message. In some aspects, the notification may be obtained from the first earbud over the Bluetooth connection. In other aspects, the notification may be obtained from another source.

Another innovative aspect of the subject matter described in this disclosure can be implemented in a wireless device. In some implementations, the wireless device may include one or more processors and a memory coupled to the one or more processors. In some implementations, the memory stores processor-readable code that, when executed by the one or more processors, is configured to operate the wireless device as a STA associated with a WLAN while also operating the wireless device as a softAP that is paired with a peripheral device over a Bluetooth connection and associated with the peripheral device via a WLAN link. Execution of the processor-readable code may be configured to obtain a request to handover communications from the WLAN link to the Bluetooth connection, and to select a sleep state beacon interval based on the handover request, the sleep state beacon interval being longer than a beacon interval associated with the WLAN. Execution of the processor-readable code may be configured to obtain a next sleep state TBTT based on the sleep state beacon interval and a TSF value of the wireless device, and to enter the softAP into a sleep state while maintaining the WLAN link in an active state. Execution of the processor-readable code may be configured to send a first message to the peripheral device over the Bluetooth connection, the first message indicating the next sleep state TBTT and the sleep state beacon interval. Execution of the processor-readable code may be configured to transmit one or more beacon frames to the peripheral device over the WLAN link during the sleep state based on the next sleep state TBTT and the sleep state beacon interval.

In some instances, the sleep state beacon interval may be an order of magnitude longer than the beacon interval associated with the WLAN. In some aspects, the WLAN link includes one or more wireless channels in a 2.4 GHz frequency band, a 5 GHz frequency band, or a 6 GHz frequency band. In other aspects, the WLAN link includes at least one of a P2P link, a TDLS link, a Wi-Fi Direct link, a link associated with a GO, or a link associated with a NAN.

Execution of the processor-readable code may be configured to receive one or more null frames from the peripheral device over the WLAN link, each null frame being responsive to a respective beacon frame. In some instances, each beacon frame includes a TIM bit set to 1, and each null frame includes a PM bit set to 0.

In various implementations, execution of the processor-readable code may be configured to transmit a first ping request to the peripheral device over the WLAN link during the sleep state, the first ping request including a first transmission control protocol/internet protocol TCP/IP frame and a first Bluetooth header encapsulated within a first WLAN-compliant packet. In some instances, execution of the processor-readable code may be configured to receive a ping response from the peripheral device over the WLAN link during the sleep state, the ping response being responsive to the first ping request and including a second TCP/IP frame and a second Bluetooth header encapsulated within a second WLAN-compliant packet. In other instances, execution of the processor-readable code may be configured to transmit a second ping request to the peripheral device over the WLAN link during the sleep state based on an absence of a ping response from the peripheral device, the second ping request including a third TCP/IP frame and a third Bluetooth header encapsulated within a third WLAN-compliant packet. In some aspects, the transmission of the second ping request is offset in time from the transmission of the first ping request by the sleep state beacon interval.

In some implementations, execution of the processor-readable code may be configured to obtain an indication of an active TWT session with the peripheral device over the WLAN link, and to tear down the TWT session prior to sending the first message to the peripheral device over the Bluetooth connection. In other implementations, execution of the processor-readable code may be configured to obtain a request to handover communications from the Bluetooth connection to the WLAN link, to obtain a next TBTT based on the beacon interval associated with the WLAN and the TSF value of the wireless device, to exit the softAP from the sleep state, and to send a second message to the peripheral device over the Bluetooth connection, the second message indicating the next TBTT and the beacon interval associated with the WLAN. In some other implementations, execution of the processor-readable code may be configured to send a third message to the peripheral device over the Bluetooth connection, the third message indicating one or more TWT parameters, to receive a TWT request from the peripheral device over the WLAN link, the TWT request being responsive to the third message, and to establish the TWT session based at least in part on the TWT request.

In various implementations, the peripheral device includes a first earbud and a second earbud, each of the first earbud and the second earbud being associated with the softAP, and each of the first earbud and the second earbud being paired with the softAP via the Bluetooth connection. In some instances, execution of the processor-readable code may be configured to return the softAP to the sleep state after sending the second message to the peripheral device, to obtain a notification that the first earbud is associated with the softAP and the second earbud is not associated with the softAP, to wake the softAP from the sleep state without changing the next TBTT or the beacon interval, to receive a connect message from the second earbud over the Bluetooth connection, and to associate with the second earbud without disassociating from the first earbud based at least in part on the connect message. In some aspects, the notification may be obtained from the first earbud over the Bluetooth connection. In other aspects, the notification may be obtained from another source.

Details of one or more implementations of the subject matter described in this disclosure are set forth in the accompanying drawings and the description herein. Other features, aspects, and advantages will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
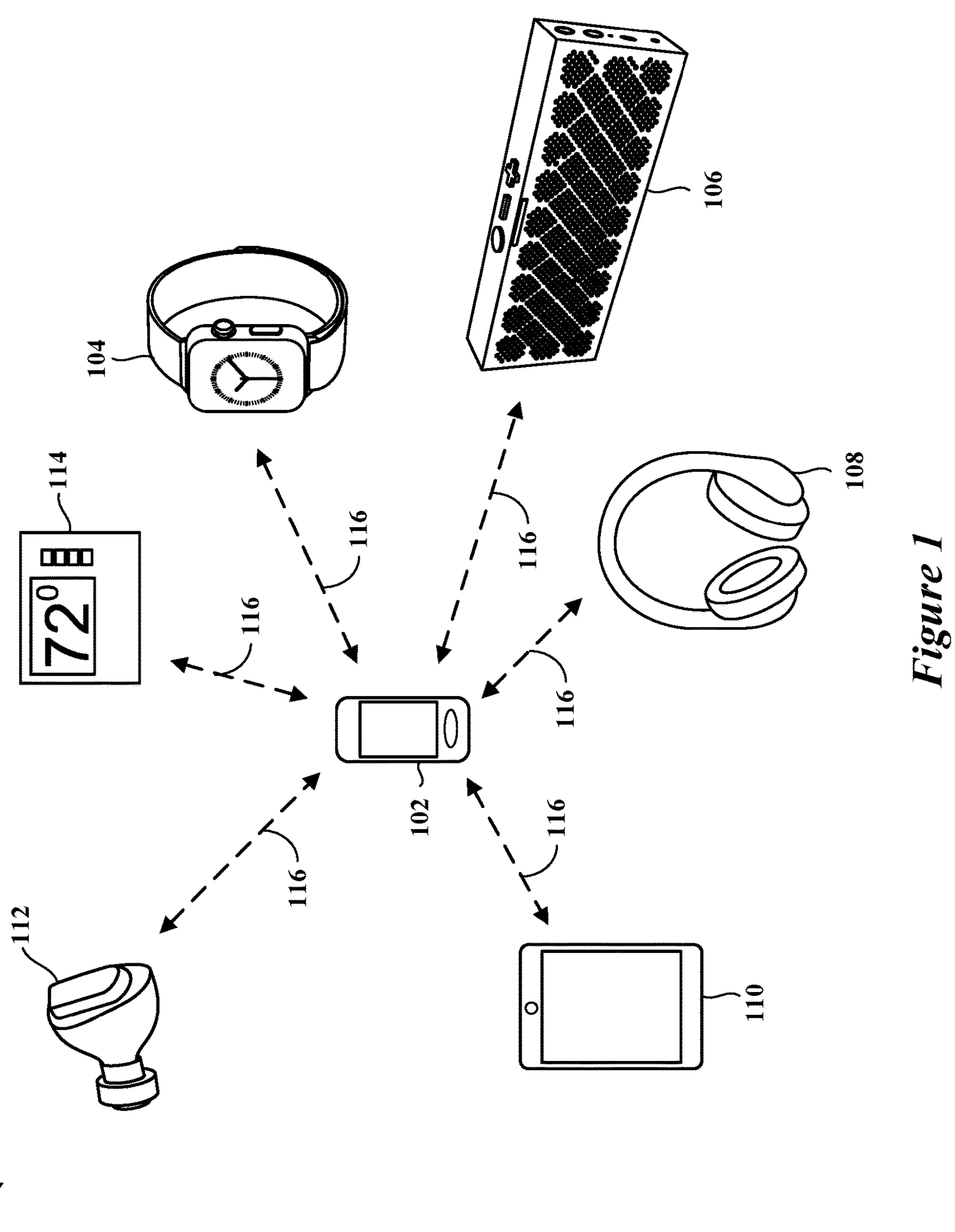
FIG. 1 shows a pictorial diagram of an example Personal Area Network (PAN), according to various aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, components, circuits, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, etc., whether referred to as software, firmware, middleware, microcode, hardware description language, or otherwise.

Accordingly, in one or more example embodiments, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

Communications based on traditional Bluetooth and BLE suffer from several limitations that can limit user experiences and negatively affect user experiences. For example, the range of traditional Bluetooth and BLE is limited by a single hop radio frequency (RF) transmission. Additionally, traditional Bluetooth and BLE have limited data capacity, which can have several negative effects on user experience. For example, the limited data capacity of traditional Bluetooth and BLE can result in limited audio quality or a quality level unacceptable to the user. Further, traditional Bluetooth and BLE are enabled for radio frequency communication operating within the globally accepted 2.4 GHz Industrial, Scientific & Medical (ISM) frequency band. However, Bluetooth and BLE devices that operate only within the 2.4 GHz frequency band may be subject to interference from other devices communicating with each other in the 2.4 GHz frequency band (such as Wi-Fi devices).

To address these limitations, Bluetooth and BLE devices may be configured in accordance with various aspects of the subject matter disclosed herein to operate using an extended Personal Area Network (XPAN) protocol that allows Bluetooth and BLE data to be communicated over wireless networks that are based on, or that are at least compatible with, Internet Protocol (IP) packets and Transmission Control Protocol/IP (TCP/IP) packets. For example, Bluetooth and BLE devices configured in accordance with the present disclosure can transmit and receive Bluetooth/BLE data over one or more channels associated with a wireless local area network (WLAN) by encapsulating Bluetooth/BLE data within packets formatted according to the IEEE 802.11 family of wireless communication standards. In this way, Bluetooth and BLE devices can communicate with one another in not only the 2.4 GHz frequency band, but also in the 5 GHZ, the 6 GHz frequency band, and other suitable frequency bands.

Communications transmitted over a wireless network such as a WLAN typically consume more power than communications transmitted via traditional Bluetooth and/or BLE protocols. The higher power consumption can negatively affect battery life of a Bluetooth-enabled device and require more frequent charging. Moreover, for wireless devices that can transmit data to a peripheral device over one or both of a Bluetooth connection and a WLAN link, handover operations between the Bluetooth connection and the WLAN link are time-consuming and may increase latencies beyond the latency and jitter requirements of some traffic flows. For example, once a wireless device and a peripheral device are paired with each other via a Bluetooth connection, the Bluetooth connection remains active and allows the devices to quickly transition between Bluetooth links (e.g., between BR/EDR links and BLE links) during soft handover operations.

When transitioning from a WLAN link to a Bluetooth connection established between the wireless device and the peripheral device, the WLAN link is typically disabled (or placed in an inactive state) to reduce power consumption of both the wireless device and the peripheral devices. As a result, when transitioning from the Bluetooth connection back to the WLAN link, the peripheral device may need to undergo association and authentication operations with the wireless device prior to using the WLAN link. The association and authentication operations are time consuming procedures that can significantly increases latencies associated with transmitting data to the peripheral device over the WLAN link (e.g., by as much as 1 second or more). The additional latencies associated with handover operations from the Bluetooth connection to the WLAN link may violate the latency and jitter requirements of various traffic flows, thereby blunting the throughput and latency benefits of transmitting data to the peripheral device over the WLAN link rather than over the Bluetooth connection.

Although the association and authentication operations may be avoided by maintaining the WLAN link in an active state after handover operations to the Bluetooth connection, maintaining the WLAN link in the active state may consume an unacceptable amount of power in both the wireless device and the peripheral device. For example, since the beacon interval specified by the IEEE 802.11 family of wireless communication standards is approximately 100 ms, maintaining the WLAN link in the active state typically requires the wireless device to broadcast beacon frames over the WLAN link every 100 ms, and typically requires the peripheral device to wake-up every 100 ms to receive the beacon frames, transmit a response to the wireless device over the WLAN link, and then return to the sleep state. As such, there is a need to increase the speed with which a wireless device and a peripheral device can perform handover operations between a Bluetooth connection and a WLAN link without consuming an unacceptable amount of power.

In accordance with various aspects of the present disclosure, a wireless device operates as a wireless station (STA) associated with a wireless local area network (WLAN) while also operating as a software-enabled access point (softAP) that is paired with a peripheral device over a Bluetooth connection and also associated with the peripheral device over a WLAN link. When the wireless device obtains a request to handover communications from the WLAN link to the Bluetooth connection, the wireless device selects or obtains a sleep state beacon interval that is longer than the beacon interval specified by the IEEE 802.11 family of wireless communication standards, and obtains a next sleep state target beacon transmission time (TTBT) based on the sleep state beacon interval and a timing synchronization function (TSF) value of the wireless device. The wireless device enters the softAP into a sleep state while maintaining the WLAN link in an active state by transmitting beacon frames to the peripheral device over the WLAN link based on the sleep state beacon interval and the sleep state TBTTs.

In this way, the wireless device can maintain the WLAN link in the active state after the handover to the Bluetooth connection by transmitting beacon frames over the WLAN link based on the sleep state beacon interval and the sleep state TBTTs.

Moreover, since the sleep state beacon interval is longer than the beacon interval specified by the IEEE 802.11 family of wireless communication standards, the wireless device may consume less power transmitting beacon frames over the WLAN link during the sleep state than transmitting beacon frames over the WLAN link during the active state. In some implementations, the sleep state beacon interval may be an order of magnitude longer than the beacon interval specified by the IEEE 802.11 family of wireless communication standards.

In some instances, the wireless device may send messages carrying control signals and/or timing information to the peripheral device over the Bluetooth connection. For example, after the softAP enters the sleep state, the wireless device may use the Bluetooth connection as a side-channel to send the sleep state TBTTs and the sleep state beacon interval to the peripheral device, for example, so that the peripheral device can wake-up and receive beacon frame transmissions from the wireless device during the sleep state.

FIG. 1 shows a pictorial diagram of an example Personal Area Network (PAN) 100, according to some implementations. Within the PAN 100, a central device 102 may connect to and establish a BLE communication link 116 with one or more peripheral devices 104, 106, 108, 110, 112, 114 using a BLE protocol or a modified BLE protocol. The BLE protocol is part of the BT core specification and enables radio frequency communication operating within the globally accepted 2.4 GHz Industrial, Scientific & Medical (ISM) band.

The central device 102 may include suitable logic, circuitry, interfaces, processors, and/or code that may be used to communicate with one or more peripheral devices 104, 106, 108, 110, 112, or 114 using the BLE protocol or the modified BLE protocol as described herein. The central device 102 may operate as an initiator to request establishment of a link layer (LL) connection with an intended peripheral device 104, 106, 108, 110, 112, or 114. A Link Manager may be used to control operations between an XPAN application controller in the central device 102 and an XPAN application controller in each of the intended peripheral devices 104, 106, 108, 110, 112, and/or 114.

After a requested link layer connection is established, the central device 102 may become a host device, and the selected or intended peripheral device 104, 106, 108, 110, 112, or 114 may become paired with the central device 102 over the established link layer connection. As a host device, the central device 102 may be capable of supporting multiple link layer connections at a time with various peripheral devices 104, 106, 108, 110, 112, or 114 operating as client devices. Specifically, the central device 102 may manage various aspects of data packet communication in a link layer connection with one or more of the associated peripheral devices 104, 106, 108, 110, 112, or 114. For example, the central device 102 may determine an operation schedule in the link layer connection with one or more peripheral devices 104, 106, 108, 110, 112, or 114. The central device 102 may also initiate a link layer protocol data unit (PDU) exchange sequence over the link layer connection. Link layer connections may be configured to run periodic connection events in dedicated data channels. The exchange of link layer data PDU transmissions between the central device 102 and one or more of the peripheral devices 104, 106, 108, 110, 112, or 114 may take place within connection events.

In some implementations, the central device 102 may be configured to transmit the first link layer data PDU in each connection event to an intended peripheral device 104, 106, 108, 110, 112, or 114. In other implementations, the central device 102 may utilize a polling scheme to poll the intended peripheral device 104, 106, 108, 110, 112, or 114 for a link layer data PDU transmission during a connection event. The intended peripheral device 104, 106, 108, 110, 112, or 114 may transmit a link layer data PDU upon receipt of packet link layer data PDU from the central device 102. In some other implementations, a peripheral device 104, 106, 108, 110, 112, or 114 may transmit a link layer data PDU to the central device 102 without first receiving a link layer data PDU from the central device 102.

Examples of the central device 102 may include a cellular phone, a smart phone, a session initiation protocol (SIP) phone, a mobile station (STA), a laptop, a personal computer (PC), a desktop computer, a personal digital assistant (PDA), a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an Internet-of-Things (IoT) device, or any other similarly functioning device.

Examples of the one or more peripheral devices 104, 106, 108, 110, 112, or 114 may include a cellular phone, a smart phone, a SIP phone, a STA, a laptop, a PC, a desktop computer, a PDA, a satellite radio, a global positioning system, a multimedia device, a video device, a digital audio player, a camera, a game console, a tablet, a smart device, a wearable device (such as a smart watch, wireless headphones, etc.), a vehicle, an electric meter, a gas pump, a toaster, a thermostat, a hearing aid, a blood glucose on-body unit, an IoT device, or any other similarly functioning device. Although the central device 102 is illustrated in communication with six peripheral devices 104, 106, 108, 110, 112, or 114 in the PAN 100, the central device 102 may communicate with more or fewer than six peripheral devices within the PAN 100 without departing from the scope of the present disclosure.

A device implementing the BT protocol, such as the central device 102, may operate according to one radio mode, such as basic rate (BR)/enhanced data rate (EDR), and a device implementing the BLE protocol may operation according to a BLE radio mode. In some aspects, the central device 102 may be configured with dual radio modes, and therefore may be able to operate according to the BR/EDR mode or the BLE mode, for example, based on the type of short-rage wireless communication in which the device may engage.

For example, the central device 102 may operate according to the BR/EDR mode for continuous streaming of data, for broadcast networks, for mesh networks, and/or for some other applications in which a relatively higher data rate may be more suitable. However, the device may operate according to the BLE mode for short burst data transmissions, such as for some other applications in which power conservation may be desirable and/or a relatively lower data rate may be acceptable. In other aspects, the central device 102 may operate according to one or more other radio modes, including proprietary radio mode(s). Examples of other radio modes may include high speed radio modes, low energy radio modes, isochronous radio modes, etc.

Figure 2:
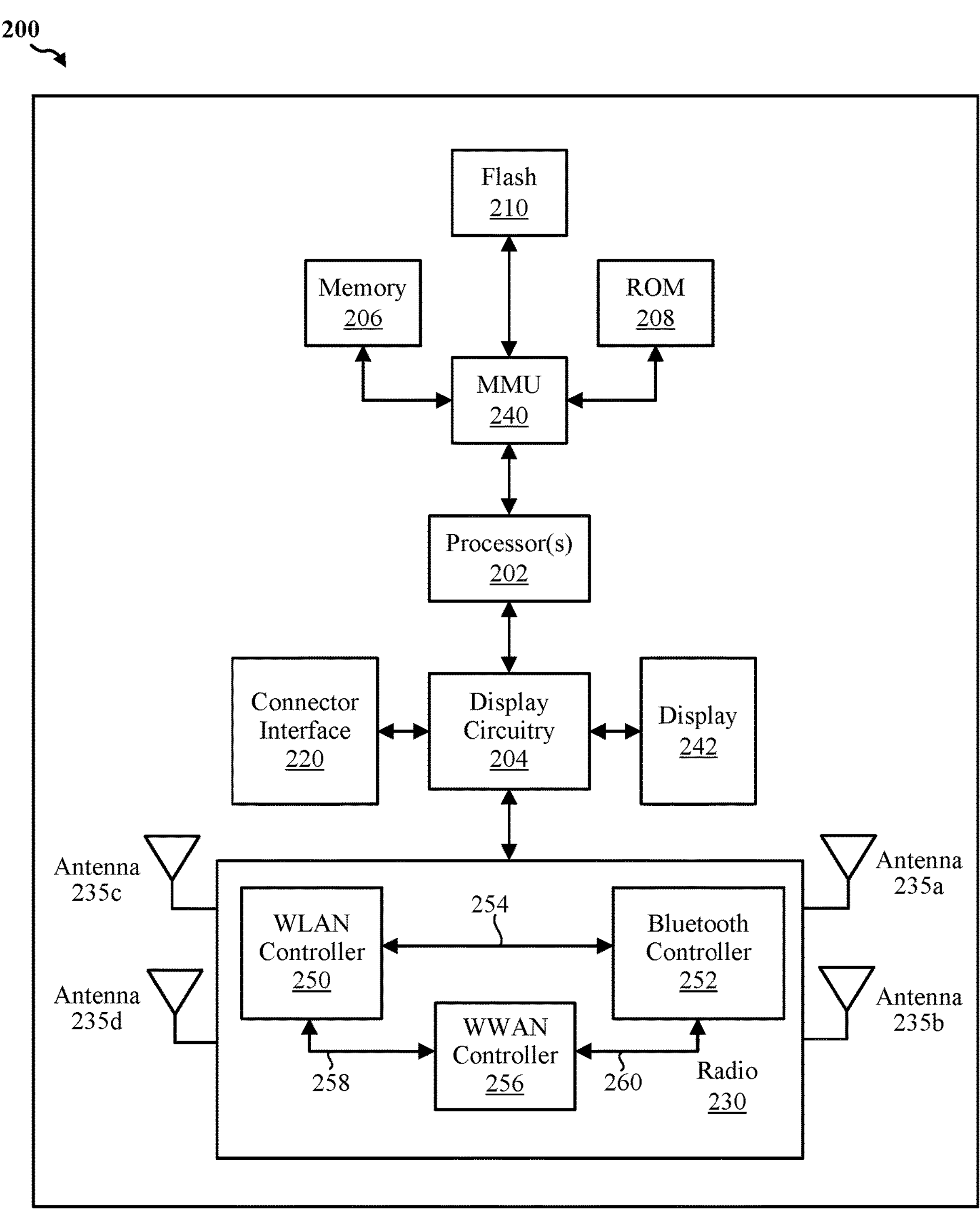
FIG. 2 shows a block diagram of a wireless device, according to various aspects of the present disclosure.

FIG. 2 shows a block diagram of a wireless device 200, according to some implementations. In some instances, the wireless device 200 may be an example of the central device 102 of FIG. 1. In other instances, the wireless device 200 may be an example of one or more of the peripheral devices 104, 106, 108, 110, 112, or 114 of FIG. 1. In some aspects, the wireless device 200 may be a Bluetooth-enabled device (such as a BLE device).

As shown, the wireless device 200 may include a processing element, such as processor(s) 202, which may execute program instructions for the wireless device 200. The wireless device 200 may also include display circuitry 204 that can perform graphics processing and present information to a user via the display 242. The processor(s) 202 may also be coupled to memory management unit (MMU) 240, which may be configured to receive addresses from the processor(s) 202 and translate the addresses to address locations in memory such as memory 206, ROM 208, or Flash memory 210) and/or to address locations in other circuits or devices, such as the display circuitry 204, radio 230, connector interface 220, and/or display 242. The MMU 240 may also be configured to perform memory protection and page table translation or set up. In some aspects, the MMU 240 may be included as a portion of the processor(s) 202.

The processor(s) 202 may be coupled to other circuits of the wireless device 200. For example, the wireless device 200 may include various types of memory, a connector interface 220 through which the wireless device 200 can communicate with the computer system, and wireless communication subsystems that can transmit data to, and receive data from, other devices based on one or more wireless communication standards or protocols. For example, in some aspects, the wireless communication subsystems may include (but are not limited to) a WLAN subsystem, a Bluetooth subsystem, or a cellular subsystem (such as an LTE or 5G NR subsystem). The wireless device 200 may include a plurality of antennas 235*a*, 235*b*, 235*c*, or 235*d* for performing wireless communication with, for example, wireless devices in a PAN.

The wireless device 200 may be configured to implement part or all of the techniques described herein by executing program instructions stored on a memory medium (such as a non-transitory computer-readable memory medium) and/or through hardware or firmware operation. In other embodiments, the techniques described herein may be at least partially implemented by a programmable hardware element, such as an field programmable gate array (FPGA), and/or an application specific integrated circuit (ASIC).

In certain aspects, the radio 230 may include separate controllers configured to control communications for various respective radio access technology (RAT) protocols. For example, as shown in FIG. 2, radio 230 may include a WLAN controller 250 that manages WLAN communications, a Bluetooth controller 252 that manages Bluetooth and BLE, and a WWAN controller 256 that manages WWAN communications. In certain aspects, the wireless device 200 may store and execute a WLAN software driver for controlling WLAN operations performed by the WLAN controller 250, a Bluetooth software driver for controlling Bluetooth operations performed by the Bluetooth controller 252, and/or a WWAN software driver for controlling WWAN operations performed by the WWAN controller 256.

In certain implementations, a first coexistence interface 254 (such as a wired interface) may be used for sending information between the WLAN controller 250 and the Bluetooth controller 252. In certain other implementations, a second coexistence interface 258 may be used for sending information between the WLAN controller 250 and the WWAN controller 256. In certain other implementations, a third coexistence interface 260 may be used for sending information between the Bluetooth controller 252 and the WWAN controller 256.

In some aspects, one or more of the WLAN controller 250, the Bluetooth controller 252, and/or the WWAN controller 256 may be implemented as hardware, software, firmware or some combination thereof.

In certain configurations, the WLAN controller 250 may be configured to communicate with a second device in a PAN using a WLAN link using all of the antennas 235*a*, 235*b*, 235*c*, and 235*d*. In certain other configurations, the Bluetooth controller 252 may be configured to communicate with at least one second device in a PAN using one or more of the antennas 235*a*, 235*b*, 235*c*, and 235*d*. In certain other configurations, the WWAN controller 256 may be configured to communicate with a second device in a PAN using all of the antennas 235*a*, 235*b*, 235*c*, and 235*d*. The WLAN controller 250, the Bluetooth controller 252, and/or the WWAN controller 256 may be configured to adjust wakeup time interval and shutdown time for the device.

Figure 3:
FIG. 3 shows a block diagram of an extended Personal Area Network (XPAN) protocol stack, according to various aspects of the present disclosure.
Figure 3:
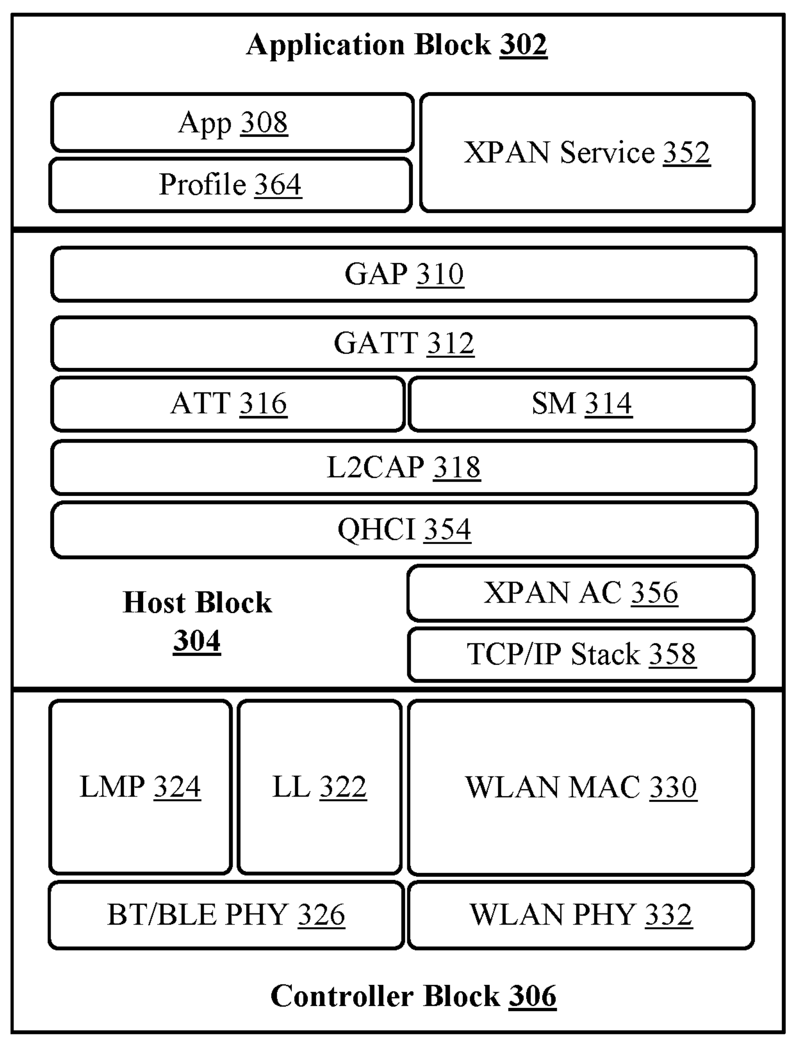

FIG. 3 shows a block diagram of an XPAN protocol stack 300, according to some implementations. The XPAN protocol stack 300 may be implemented by one or more of processor(s) 202, memory 206, Flash memory 210, ROM 208, the radio 230, and/or the Bluetooth controller 252 described with reference to FIG. 2. In some implementations, the XPAN protocol stack 300 may be organized into three blocks, namely, the Application block 302, the Host block 304, and the Controller block 306. The Application block 302 may be a user application that interfaces with the other blocks and/or layers of the XPAN protocol stack 300. In some aspects, the Application block 302 may include one or more applications and one or more Bluetooth profiles that allow the applications to use the Bluetooth (BT) and BLE communications. The Host block 304 may include the upper layers of the XPAN protocol stack 300, and the Controller block 306 may include the lower layers of the XPAN protocol stack 300. The Host block 304 may communicate with a controller (such as the Bluetooth controller 252 of FIG. 2) in a wireless device using a Host Controller Interface (HCI) such as QHCI 354. The QHCI 354 may also be used as an interface between the Controller block 306 and the Host block 304 that allows a wide range of Hosts to interface with the Controller block 306. In some aspects, the Controller block 306 may be used for hardware interface management, link establishment, and link management.

The Application block 302 may include a higher-level Application Layer (App) 308, a Profile Layer (Profile) 364, and an XPAN Service layer 352. The Host block 304 may include a Generic Access Profile (GAP) 310, a Generic Attribute Protocol (GATT) 312, a Security Manager (SM) 314, an Attribute Protocol (ATT) 316, a Logical Link Control and Adaptation Protocol (L2CAP) 318, and the QHCI 354. In some aspects, the Host block 304 may also include an XPAN Application Controller (XPAN AC) 356 and a TCP/IP stack 358. The Controller block 306 may include a Link Layer (LL) 322, a Link Manager Protocol (LMP) 324, a BT/BLE Physical Layer (PHY) 326, a WLAN MAC 330, and a WLAN Physical Layer (WLAN PHY) 332.

To support IoT applications, audio applications, and other applications, the BT/BLE PHY 326 may be configured to support wider communication bandwidths and data rate than PHYs associated with conventional Bluetooth or BLE protocol stacks. For example, in some aspects, the BT/BLE PHY 326 may define the mechanism for transmitting a bit stream over a physical link that connects BLE devices. The bit stream may be grouped into code words or symbols, and converted to a PDU that is transmitted over a wireless medium. The BT/BLE PHY 326 may provide an electrical, mechanical, and procedural interface for the wireless medium. Specifically, the BT/BLE PHY 326 may specify the frequency band, the channel bandwidth, the modulation and coding scheme (MCS), the cyclic-shift diversity (CSD), and other physical aspects of wireless transmissions. The WLAN PHY 332 may define the mechanism for transmitting a bit stream over a physical WLAN link that connects two or more devices (such as WLAN devices). The BT/BLE PHY 326 and the WLAN PHY 332 may provide an electrical, mechanical, and procedural interface to the transmission medium. The shapes and properties of the electrical connectors, the frequency band used for transmission, the modulation scheme, and similar low-level parameters may be specified by the BT/BLE PHY 326 and WLAN PHY 332.

The LMP 324 may be responsible for low level communication over the BT/BLE PHY 326. The LMP 324 may manage the sequence and timing of transmitted and received link layer data PDUs, and using a link layer protocol, communicate with other devices regarding connection parameters and data flow control. In some aspects, the LMP 324 may provide gate keeping functionality to limit exposure and data exchange with other devices. In some implementations, the LMP 324 may maintain a list of allowed devices and ignore all requests for baseband PDU exchange from devices not on the list. The LMP 324 may use the QHCI 354 to communicate with upper layers of the XPAN protocol stack 300. In certain aspects, the LMP 324 may be used to generate a baseband PDU and/or an empty packet (such as an empty PDU) that may be transmitted using a LMP communication link established with another traditional BT device (such as a BR/EDR device) using the LMP 324.

The LL 322 may be responsible for low level communication over the BT/BLE PHY 326. The LL 322 may manage the sequence and timing of transmitted and received LL data PDUs, and using a LL protocol, communicate with other devices regarding connection parameters and data flow control. The LL 322 may provide gate keeping functionality to limit exposure and data exchange with other devices. If filtering is configured, the LL 322 may maintain a list of allowed devices and ignore all requests for data PDU exchange from devices not on the list. The LL 322 may use the QHCI 354 to communicate with upper layers of the XPAN protocol stack 300. In certain aspects, the LL 322 may be used to generate a LL data PDU and/or an empty packet (such as an empty PDU) that may be transmitted using a LL communication link established with another BLE device using the LL 322

The L2CAP 318 may encapsulate multiple protocols from the upper layers into a link layer data PDU and/or a QLL establishment PDU (and vice versa). The L2CAP 318 may also break large link layer data PDUs and/or a QLL establishment PDUs from the upper layers into segments that fit into a maximum payload size (such as 27 bytes) on the transmit side. Similarly, the L2CAP 318 may receive multiple link layer data PDUs and/or QLL establishment PDUs that have been segmented, and the L2CAP 318 may combine the segments into a single link layer data PDU and/or a QLL establishment PDU that may be sent to the upper layers.

The ATT 316 may be a client/server protocol based on attributes associated with a BLE device configured for a particular purpose (such as monitoring heart rate, monitoring temperature, broadcasting advertisements, etc.). The attributes may be discovered, read, and written by other BLE enabled devices. The set of operations which are executed over ATT 316 may include, but are not limited to, error handling, server configuration, find information, read operations, write operations, queued writes, etc. The ATT 316 may form the basis of data exchange between BLE devices.

The SM 314 may be responsible for device pairing and key distribution. A security manager protocol implemented by the SM 314 may define how communications with the SM of a counterpart BLE deice are performed. The SM 314 may provide additional cryptographic functions that may be used by other components of the modified BLE protocol stack 300. The architecture of the SM 314 used in BLE may be designed to minimize recourse requirements for peripheral devices by shifting work to a central device. The SM 314 provides a mechanism to not only encrypt the data but also to provide data authentication.

The GATT 312 describes a service framework using the attribute protocol for discovering services, and for reading and writing characteristic values on a counterpart BLE device. The GATT 312 interfaces with the App 308 through the App's profile. The App 308 profile defines the collection of attributes and any permission associated with the attributes to be used in BLE communications. One of the benefits of BT technology is device interoperability. To assure interoperability, using a standardized wireless protocol to transfer bytes of information may be inadequate, and hence, sharing data representation levels may be needed. In other words, BLE devices may send or receive data in the same format using the same data interpretation based on intended device functionality. The attribute profile used by the GATT 312 may act as a bridge between the modified BLE protocol stack and the application and functionality of the BLE device (at least from a wireless connection point of view), and is defined by the profile.

The GAP 310 may provide an interface for the App 308 to initiate, establish, and manage connection with counterpart BT/BLE devices. The profile layer 364 may include a set of BT/BLE profiles including, but not limited to, A2DP, AVRCP, HFP, and the like. The profiles of the profile layer 364 may operate over the L2CAP 318. The XPAN Service 352 may determine whether a peripheral device (such as one of the peripheral devices 104, 106, 108, 110, 112, or 114 of FIG. 1) supports the XPAN protocol and/or is enabled to communicate via the XPAN protocol. The XPAN Service 352 may be configured to exchange features (such as control point notifications) with the second device based on some triggers, events, and/or conditions detected or determined by the first device (such as via processor 202 of the first device). The exchanged features (such as the control point notifications) may indicate to the second device one or more actions the second device may perform.

The QHCI 354 may determine whether a Bluetooth packet is to be transmitted using a traditional Bluetooth protocol or using the XPAN protocol disclosed herein. The XPAN protocol bearer may be a software enabled access point (softAP) or an access point (AP). An XPAN protocol bearer may operate over multiple globally accepted ISM bands including, but not limited to, the 2.4 GHz ISM band, the 5 GHz ISM band, the 6 GHz ISM band, and the like. In some implementations, a WLAN radio of the device and/or the App layer 308 of the device may be configured to select one of the globally accepted ISM band over which the XPAN protocol bearer operates.

If the QHCI 354 determines that the Bluetooth packet and/or payload is to be transmitted via the XPAN protocol, then the QHCI 354 may route the Bluetooth packet and/or payload to the XPAN AC 356. In some aspects, the QHCI 354 may indicate to the XPAN AC 356 that the Bluetooth packet and/or payload is to be transmitted using the XPAN protocol.

The XPAN AC 356 may be configured to encapsulate data packets in a manner indicating that the data packets are to be transmitted over a WLAN channel or link using the XPAN protocol. For example, the XPAN AC 356 may add, to each data packet that is to be transmitted using the XPAN protocol, a header indicating that the respective data packet is formatted for transmission based on the XPAN protocol. The XPAN AC 356 may also be configured to decapsulate data packets received using the XPAN protocol, and forward the decapsulated data to other layers of the XPAN protocol stack 300. In some aspects, the XPAN AC 356 may decapsulate received XPAN packets by stripping the XPAN headers from the received XPAN packets and forwarding the decapsulated data to the other layers of the XPAN protocol stack 300.

The TCP/IP stack 358 may encapsulate XPAN packets with TCP/IP or TCP/UDP headers and forward the encapsulated XPAN packets to the WLAN MAC 330. The TCP/IP stack 358 may decapsulate packets received via the XPAN link and forward the decapsulated data to the other layers of the XPAN protocol stack 300. The WLAN PHY 332 may transmit XPAN packets to, and receive XPAN packets from, a peripheral device over a WLAN channel or link. In some aspects, the WLAN MAC 330 may be responsible for low level communication over the WLAN PHY 332.

Figure 4A:
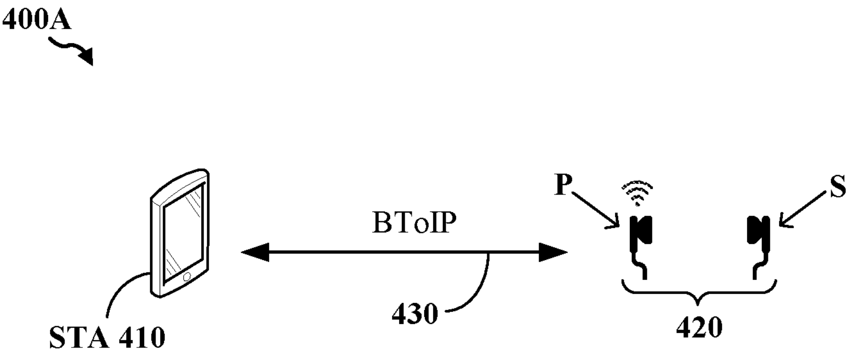
FIGS. 4A-4B show example topologies of a wireless network that supports wireless communications using the XPAN protocol disclosed herein.
Figure 4B:
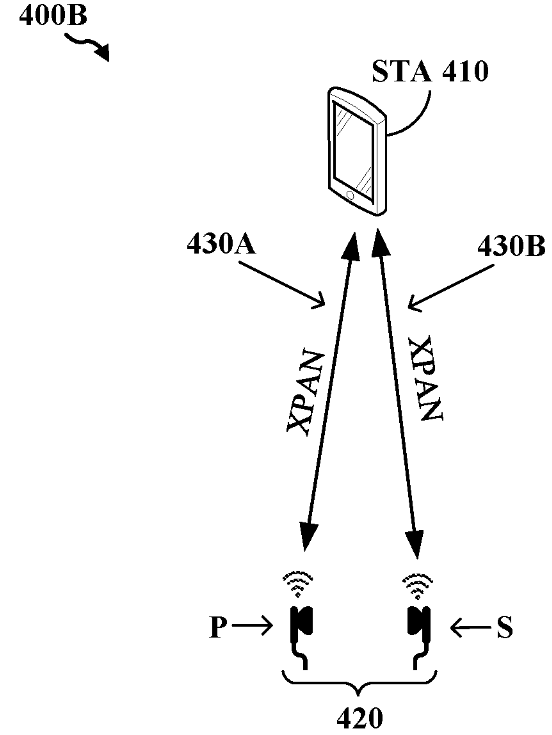

FIGS. 4A-4B show example topologies of wireless networks that support wireless communications using the XPAN disclosed herein. For example, FIG. 4A shows an example wireless network 400A that includes a STA 410 and a pair of earbuds 420 that may be paired with each other via a Bluetooth connection. In some implementations, the STA 410 may be one example of the central device 102 of FIG. 1, and the earbuds 420 may be one example of the peripheral device 112 of FIG. 1. In various aspects, the STA 410 and earbuds 420 are also connected by a communication link 430 over which the STA 410 and the earbuds 420 may exchange data and other information with each other based on the XPAN protocol disclosed herein. As discussed, the XPAN protocol allows the STA 410 to transmit Bluetooth-encoded data (such as an audio stream or a video stream) to the earbuds 420 over the communication link 430 using frames or packets compliant with the IEEE 802.11 family of wireless communication standards.

The communication link 430 may be any suitable contention-based communication link that allows the STA 410 and the earbuds 420 to communicate with each other using WLAN-compliant data packets. In some aspects, the communication link 430 may be a Wi-Fi link such as (but not limited to) a P2P link, a TDLS link, or a Wi-Fi Direct link. In some instances, the STA 410 may implement a softAP that operates on the same wireless channels as the STA 410, and the earbuds 420 may be associated with the softAP. In this way, the earbuds 420 may be associated with the softAP, which may allow the STA 410 to communicate directly with the earbuds 420 over the communication link 430 without tunneling through an access point (AP).

FIG. 4B shows an example wireless network 400B that includes the STA 410 and earbuds 420 described with reference to FIG. 4A. The wireless network 400B is similar to the wireless network 400A of FIG. 4A, except that the first and second earbuds (P and S, respectively) in the example of FIG. 4B have direct communication links 430A and 430B, respectively, with the STA 410. In this example, the STA 410 may transmit a data stream to each of the first earbud (P) and the second earbud(S) via respective communication links 430A and 430B, concurrently.

Figure 5A:
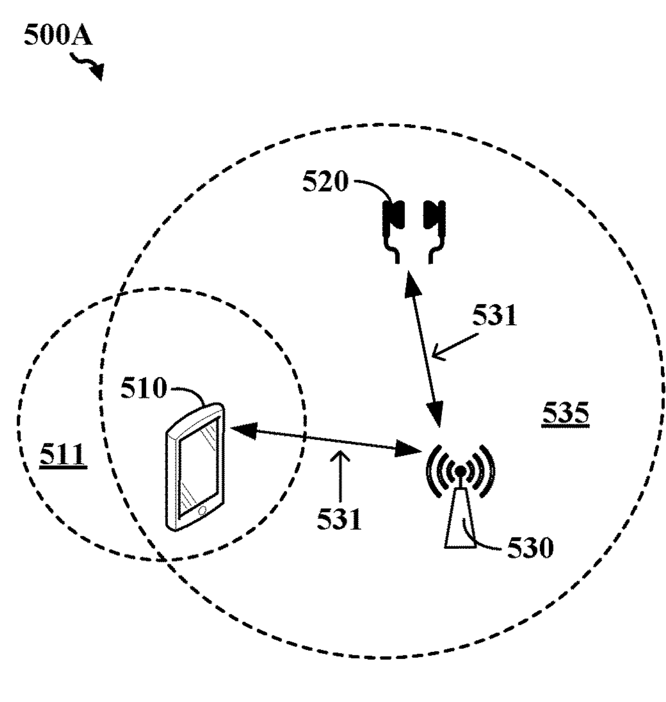
FIGS. 5A-5B show example topologies of other wireless networks that support wireless communications using the XPAN protocol disclosed herein.
Figure 5B:
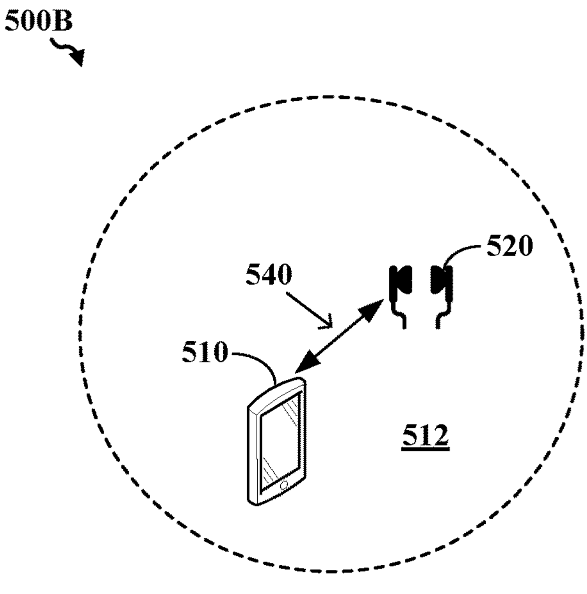

FIGS. 5A-5B show example topologies of other wireless networks 500A and 500B that support wireless communications using the XPAN disclosed herein. The wireless network 500A of FIG. 5A is shown to include a STA 510, a pair of earbuds 520 that may be paired with the STA 510 via a Bluetooth connection, and an AP 530. In some implementations, the STA 510 may be one example of the central device 102 of FIG. 1, and the earbuds 520 may be one example of the peripheral device 112 of FIG. 1. The AP 530 may operate a BSS on one or more wireless channels, and may provide a wireless coverage area 535 for WLAN communications over the one or more wireless channels. The STA 510 may be associated with the AP 530, and may receive data streams directly from the AP 530 over one or more WLAN channels 531. The STA 510 may also provide a wireless coverage area 511 for Bluetooth communications with the earbuds 520.

In the example of FIG. 5A, the earbuds 520 are located outside of the Bluetooth coverage area 511 provided by the STA 510, and therefore the STA 510 may not be able to transmit a data stream to the earbuds 520 via the Bluetooth connection. In various aspects, the earbuds 520 may also be associated with the AP 530. Specifically, the earbuds 520 may operate as a client device of the AP 530, and may receive data streams directly from the AP 530 over the one or more WLAN channels 531 based on the XPAN disclosed herein.

FIG. 5B shows an example wireless network 500B that includes the STA 510 and the earbuds 520 described with reference to FIG. 5A. In the example of FIG. 5B, the earbuds 520 are located within a wireless coverage area 512 provided by the STA 510. As such, the STA 510 and earbuds 520 may communicate with each other directly, without the presence of an AP, using a communication link 540. In various aspects, the communication link 540 allows the STA 510 and the earbuds 520 to exchange data and other information with each other based on the XPAN protocol disclosed herein. The communication link 540 may be any suitable contention-based communication link that allows the STA 510 and the earbuds 520 to communicate with each other using WLAN-compliant data packets. In some aspects, the communication link 540 may be a Wi-Fi link such as (but not limited to) a P2P link, a TDLS link, or a Wi-Fi Direct link.

Figure 6:
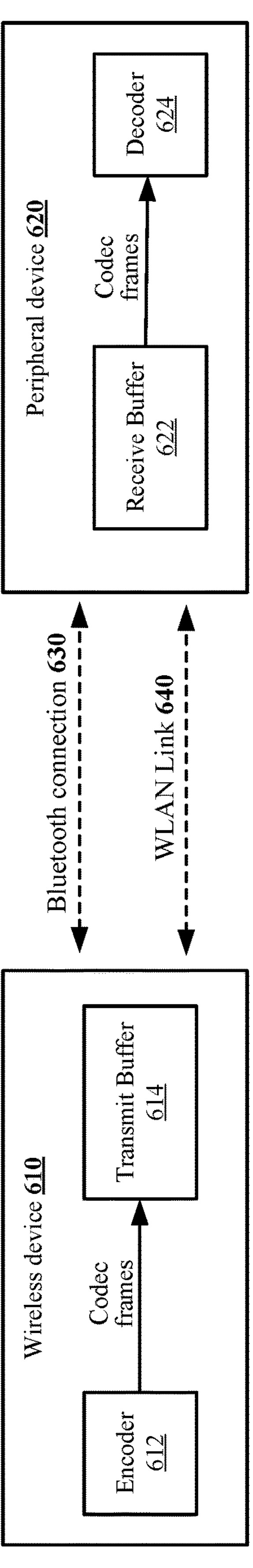
FIG. 6 depicts communications between a wireless device and a peripheral device over a Bluetooth connection and a WLAN link, according to various aspects of the present disclosure.

FIG. 6 depicts communications 600 between a wireless device 610 and a peripheral device 620 over a Bluetooth connection 630 and a WLAN link 640, according to various aspects of the present disclosure. In some implementations, the wireless device 610 may be one example of the central device 102 of FIG. 1 or the wireless device 200 of FIG. 2, and the peripheral device 620 may be an example of one or more of the peripheral devices 104, 106, 108, 110, 112 or 114 of FIG. 1. In some instances, the peripheral device 620 may be a pair of earbuds such as the earbuds 420 of FIGS. 4A-4B or the earbuds 520 of FIGS. 5A-5B. The WLAN link 640 may be one or more wireless channels operated by or associated with a WLAN (or any other suitable wireless network). In various aspects, the wireless channels may be in the 2.4 GHz frequency band, the 5 GHz frequency band, the 6 GHz frequency band, or the 60 GHz frequency band. In some instances, the WLAN link 640 may be a P2P link, a TDLS link, a Wi-Fi Direct link, a link associated with a Group Owner (GO), or a link associated with a Neighborhood Area Network (NAN). The Bluetooth connection 630 may be any suitable Bluetooth-compliant link or channel including (but not limited to) an asynchronous connectionless (ACL) link, a Logical Link Control and Adaptation Protocol (L2CAP) link, an Advanced Audio Distribution Profile (A2DP) link, a synchronous connection-oriented (SCO) link, or an isochronous (ISO) link.

The wireless device 610 is shown to includer an encoder 612 and a transmit buffer 614. The encoder 612 may be configured to encode data, such as audio or video data, using a specified bitrate. The transmit buffer 614 may be configured to queue data packets that are to be transmitted to the peripheral device 620 over the Bluetooth connection 630 or the WLAN link 640. In some implementations, the data packets to be transmitted to the peripheral device 620 may be of a predefined size, for example, based whether the transmission is over the Bluetooth connection 630 or the WLAN link 640 and/or the channel conditions of the link or connection. In some aspects, data encoded by the encoder 612 may be packetized into a data packet of a predefined size. The wireless device 610 may de-queue data packets from the transmit buffer 614 and transmit the data packets to the peripheral device 620 over the Bluetooth connection 630 or the WLAN link 640.

The peripheral device 620 is shown to includer a receive buffer 622 and a decoder 624. Data packets received over the Bluetooth connection 630 or the WLAN link 640 may be queued or otherwise stored in the receive buffer 622. The data packets may be output from the receive buffer 622 and forwarded to the decoder 624. In some aspects, the decoder 624 may decode data (such as audio and/or video data) carried in the payloads of the queued data packets, and forward the decoded data to upper layers of the protocol stack for processing and playback to a user.

In some implementations, the encoder 612 may encode a first encoder/decoder (codec) frame using a first bitrate, and forward the first codec frame to the transmit buffer 614 to be packetized for transmission to the peripheral device 620 over the Bluetooth connection 630 or the WLAN link 640. For instances in which the first codec frame is too large to be packetized within a data packet of the predefined size, a first portion of the first codec frame that fits within a data packet may be de-queued from the transmit buffer 614 and transmitted to the peripheral device 620 over the Bluetooth connection 630 or the WLAN link 640. A second portion of the first codec frame, which did not fit within the data packet transmitted to the peripheral device 620, may be transmitted to the peripheral device 620 in a subsequent data packet.

The peripheral device 620 may queue the received data packet in the receive buffer 622, and may forward the first portion of the first codec frame to the decoder 624 for decoding. In some instances, the decoder 624 may not be able to decode the first portion of the first codec frame without the second portion of the first codec frame. The resulting delay in decoding the first codec frame may cause “jitter” in the playback of audio and/or video data carried in the first codec frame, which may adversely impact user experience. In some instances, the delay in timely delivery of the first codec frame to the peripheral device 620 may be reduced by increasing the bitrate used to encode the data. In other instances, the delay in timely delivery of the first codec frame to the peripheral device 620 may be reduced by increasing the transmit power level used for transmitting data packets over the Bluetooth connection 630 to the peripheral device 620.

Figure 7:
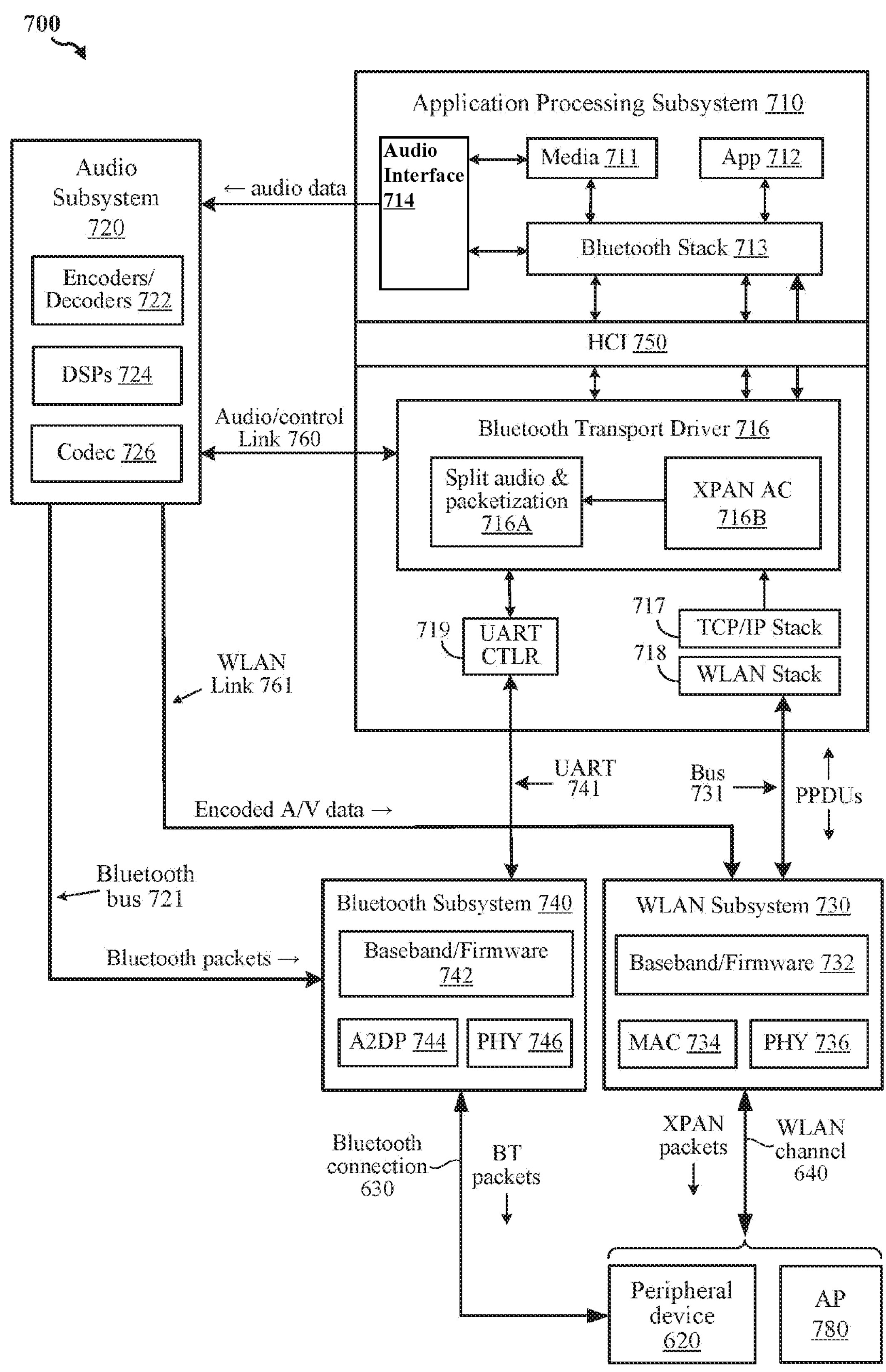
FIG. 7 shows a block diagram of another example wireless device, according to various aspects of the present disclosure.

FIG. 7 shows a block diagram of another example wireless device 700, according to various aspects of the present disclosure. In some implementations, the wireless device 700 may be an example of the central device 102 of FIG. 1, the wireless device 200 of FIG. 2, or the wireless device 610 of FIG. 6. In some instances, the wireless device 700 may operate as a STA that can transmit data to and receive data from an associated AP 780 over a wireless channel 781 of a WLAN, while also operating as a softAP that can transmit data to and receive data from the peripheral device 620 over the WLAN link 640 using the XPAN protocol disclosed herein. In some instances, the peripheral device 620 may be paired with the wireless device 700 based on the Bluetooth or BLE protocol. For example, in some aspects, the peripheral device 620 may be a pair of earbuds or headphones that can exchange Bluetooth-encoded data and other signals with the wireless device 700 over the Bluetooth connection 630 using a Bluetooth or BLE protocol, and can also exchange Bluetooth-encoded data and other information with the wireless device 700 over the WLAN link 640 using the XPAN protocol disclosed herein.

The wireless device 700 may include an Application Processing subsystem 710, an Audio subsystem 720, a WLAN subsystem 730, a Bluetooth subsystem 740, and a Host Controller Interface (HCI) 750. The Application Processing subsystem 710, which may correspond to at least some portions of the application layer and the Host block of the XPAN protocol stack 300 of FIG. 3, is shown to include a media player 711, an Application Layer (App) 712, a Bluetooth stack 713, and an audio interface 714. The media player 711 can be suitable device or component capable of generating or receiving multimedia content including, for example, real-time audio streams, real-time video streams, real-time gaming streams, and other latency-sensitive traffic. The Application Layer 712, which may be one implementation of the Application block 302 of FIG. 3, includes at least one Bluetooth profile that defines the collection of attributes and associated permissions to be used in Bluetooth or BLE communications. In some aspects, the Application Layer 712 may include processing resources including (but not limited to) the memory 206, the ROM 208, and the Flash memory 210 of FIG. 2. The Bluetooth stack 713 may be one implementation of the XPAN protocol stack 300 of FIG. 3.

The Bluetooth transport driver 716 may include a split audio and packetization module 716A and an XPAN AC 716B. The split audio and packetization module 716A may be responsible for packetizing data (such as audio and/or video data) into Bluetooth frames that can be transmitted to the peripheral device 620 using either a Bluetooth/BLE protocol or the XPAN protocol disclosed herein. The XPAN AC 716B, which may be one example of the XPAN AC 356 of FIG. 3, may be configured to encapsulate Bluetooth packets in a manner that indicates whether the Bluetooth packets are to be transmitted using the Bluetooth/BLE protocol or the XPAN protocol disclosed herein, as described with reference to FIG. 3. For example, the XPAN AC 716B may add headers to the Bluetooth packets indicating that the Bluetooth packets are to be transmitted to the peripheral device 620 using the XPAN protocol disclosed herein. The XPAN AC 716B may also be configured to decapsulate data packets received over the WLAN link 640 and forward the decapsulated data to other layers of the Bluetooth stack 713. Further, although shown in the example of FIG. 7 as provided in the Host, in other implementations, the XPAN AC 716B may be provided within the WLAN subsystem 730.

The Bluetooth transport driver 716 is connected to the audio subsystem 720 via an audio and control link 760. In some instances, the audio and control link 760 may be used to send encoded audio/video data and control signals between the Bluetooth transport driver 716 and audio/video DSPs within the audio subsystem 720. The TCP/IP stack 717 allows the wireless device 700 to exchange data and control information with corresponding layers of a TCP/IP stack implemented in the peripheral device 620. For example, the TCP/IP stack 717 may be used to format frames or packets for transmission based on the TCP/IP transmission protocol, and may be used to extract data from frames or packets received based on the TCP/IP transmission protocol.

The WLAN stack 718 allows the wireless device 700 to exchange data and control information with corresponding layers of a WLAN stack implemented in the AP 780 and/or with corresponding layers of a WLAN stack implemented in the peripheral device 620. For example, the WLAN stack 718 may be used to format frames or packets for transmission as IEEE 802.11-compliant PPDUs to the AP 780 over the WLAN channel 781, and may be used to extract data from IEEE 802.11-compliant PPDUs received from the AP 780 over the WLAN channel 781. In some instances, the WLAN stack 718, the TCP/IP stack 717, and the UART controller 719 may correspond to a Kernel space of the Application Processing subsystem 710. The UART 741, which is managed by the UART controller 719, provides a 3-wire interface (such as a transmit wire, a receive wire, and a ground wire) between the Application Processing subsystem 710 and the Bluetooth subsystem 730. A bus 731 provides a connection between the WLAN stack 718 and the WLAN subsystem 730. The bus 731 may be any suitable bus, signal line, or signaling that can be used to exchange PPDUs, control information, and other signals between the WLAN stack 718 and the WLAN subsystem 730. For example, in some aspects, the bus 731 may be a PCIe bus, soundwire, an Inter-IC Sound (I2S) bus, and the like.

The Audio subsystem 720 may include encoders/decoders 722, one or more digital signal processors (DSPs) 724, and one or more codecs 726. The encoders/decoders 722 may be used to sample audio/video data extracted from one or more PPDUs received over one or more WLAN channels 781 and processed in the Application Processing subsystem 710 based at least in part on a Bluetooth profile. In some implementations, the encoders/decoders 722 may partition the sampled audio/video data into payloads that can be embedded within one or more Bluetooth packets for transmission to the peripheral device 620 over the Bluetooth connection 630. In some other implementations, the encoders/decoders 722 may partition the sampled audio/video data into Ethernet frames or packets that can be encapsulated within IEEE 802.11-compliant PPDUs for transmission to the peripheral device 620 over the WLAN link 640. In some instances, the DSPs 724 and/or the codecs 726 may employ one or more encoding or decoding algorithms in conjunction with sampling the audio data.

The WLAN subsystem 730 may include a WLAN baseband circuit and firmware block 732, a MAC layer 734, and a PHY 736. The WLAN firmware may control operations of the WLAN subsystem 730, and may determine the protocol and configuration of one or both of the MAC layer 734 or the PHY 736. The WLAN baseband circuit may decode and/or process received data at baseband frequency, and may process and encode outgoing data at baseband frequency. The MAC layer 734 and the PHY 736 are collectively responsible for embedding outgoing data into MAC frames (such as MSDUs), encapsulating the MAC frames into data packets (such as PPDUs), and transmitting the data packets over the WLAN channel 781 to one or more other wireless devices. The MAC layer 734 and the PHY 736 are also collectively responsible for receiving data packets (such as PPDUs) over the WLAN channel 781, extracting data from the MAC frames encapsulated in the received data packets, and decoding the extracted data.

Specifically, when the WLAN subsystem 730 is in a receive mode, the PHY 736 may be used to receive, demodulate, and down-convert PPDUs received over the WLAN channel 781, and the MAC layer 734 may be used to decode data encapsulated in the received PPDUs. The MAC layer 734 may also forward the decoded data to the Application Processing subsystem 710 via the HCI 750. When the WLAN subsystem 730 is in a transmit mode, the MAC layer 734 may be used to construct and format MAC frames to carry data provided by the upper layers, and the PHY 736 may encapsulate the MAC frames within one or more PPDUs for transmission over the WLAN channel 781. In some aspects, the PHY 736 may define the mechanism for transmitting A/V bitstreams to the peripheral device 620 over the WLAN link 640 based on the XPAN protocol disclosed herein.

The Bluetooth subsystem 740 may include a Bluetooth baseband circuit and firmware block 742, an advanced audio distribution profile (A2DP) circuit 744, and a PHY 746. The Bluetooth baseband circuit and firmware block 742 may be used to generate baseband signals for constructing and deconstructing data frames based on the Bluetooth or BLE protocol. The Bluetooth baseband circuit and firmware block 742 may also be used to generate carrier signals for up-converting baseband signals during data transmissions and for down-converting received data signals to baseband. The A2DP circuit 744 may be used to control or manage an A2DP link between the wireless device 700 and the peripheral device 620. Specifically, when the Bluetooth subsystem 740 is in a receive mode, the PHY 746 can be used to receive, demodulate, and down-convert data packets received over the Bluetooth connection 630, and to forward the data packets to the Application Processing subsystem 710. When the Bluetooth subsystem 740 is in a transmit mode, the PHY 746 can be used to encapsulate data provided from the upper layers into one or more Bluetooth frames or packets for transmission to the peripheral device 620 over the Bluetooth connection 630.

In various aspects, the wireless device 700 may include a WLAN link 761 connected between the Audio subsystem 720 and the WLAN subsystem 730. The WLAN link 761 may provide a direct link or channel over which Bluetooth-encoded audio/video data can be sent from the audio subsystem 720 to the WLAN subsystem 730 without passing through or accessing the Application Processing subsystem 710. Specifically, the WLAN link 761 may allow Bluetooth-encoded data to be forwarded directly from the audio subsystem 720 to the WLAN subsystem 730 for transmission to the peripheral device 620 over the WLAN link 640 without consuming processing cycles of the application processor, thereby avoiding latencies associated with the application processor and also avoiding latencies associated with the TCP/IP stack 717. In this way, the WLAN link 761 can reduce jitter and latency by directly routing Bluetooth-encoded data from the audio subsystem 720 to the WLAN subsystem 730.

In some instances, the wireless device 700 may transmit the data stream to the peripheral device 620 using a Target Wake Time (TWT) operation specified by the 802.11ax, 802.11be, and later amendments to the IEEE 802.11 family of wireless communication standards. In other instances, the wireless device 700 may transmit the data stream to the peripheral device 620 using a restricted-TWT (r-TWT) operation specified by the 802.11be and later amendments to the IEEE 802.11 family of wireless communication standards. The restricted TWT operation allows the wireless device 700 to establish one or more r-TWT service periods (SPs) that can be used to provide more predictable latency, reduced worst case latency, reduced jitter, and higher reliability for latency-sensitive traffic. For example, all peripheral devices that support restricted TWT operation that are TXOP holders outside of any r-TWT SP for which they are not a member to end their respective TXOPs before the start of the r-TWT SP. In some aspects, membership in a r-TWT SP may be reserved exclusively for peripheral devices associated with latency-sensitive traffic.

Figure 8A:
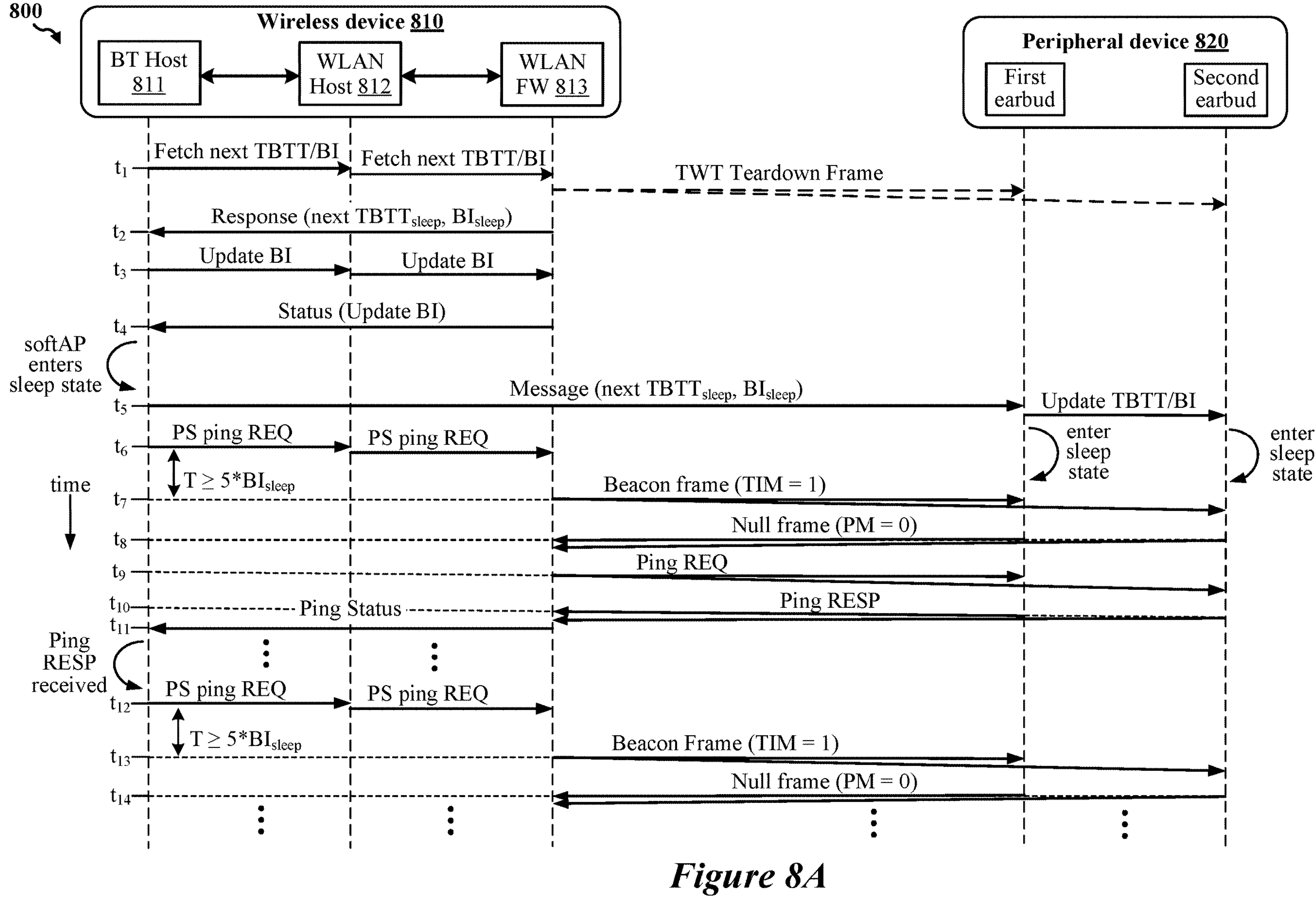
FIG. 8A shows a sequence diagram depicting an example wireless communication that supports a wireless device and a peripheral device entering a sleep state, according to various aspects of the present disclosure.

FIG. 8A shows a sequence diagram depicting an example wireless communication 800 that supports a wireless device and a peripheral device entering a sleep state, according to various aspects of the present disclosure. The wireless communication 800 may be performed between a wireless device 810 and a peripheral device 820. The wireless device 810 may be an example of the central device 102 of FIG. 1, the wireless device 200 of FIG. 2, the wireless device 610 of FIG. 6, or the wireless device 700 of FIG. 7. In some instances, the wireless device 810 may operate as a STA that may be associated with a WLAN while also operating as a softAP. The peripheral device 820 may be an example of one or more of the peripheral devices 104, 106, 108, 110, 112, or 114 of FIG. 1, the earbuds 420 of FIGS. 4A-4B, the earbuds 520 of FIGS. 5A-5B, or the peripheral device 620 of FIGS. 6-7. In the example of FIG. 8A, the peripheral device 820 is shown as a pair of earbuds that includes a first earbud and a second earbud. The first earbud may be closer to the wireless device 810 than the second earbud, and therefore data packets transmitted by the wireless device 810 may arrive at the first earbud before arriving at the second earbud.

The peripheral device 820 may be associated with the softAP via a WLAN link or channel while also being paired with the softAP via a Bluetooth connection. In this way, the softAP may communicate with the peripheral device 820 using Bluetooth communications over the Bluetooth connection, and may also communicate with the peripheral device 820 using WLAN-compliant frames or packets over the WLAN link (e.g., using the XPAN protocol described herein).

The wireless device 810 may include at least Bluetooth host 811, a WLAN host 812, and WLAN firmware 813. The Bluetooth host 811, which may operate in conjunction with a Bluetooth MAC and PHY (not shown in FIG. 8A for simplicity), allows the wireless device 810 to communicate with the peripheral device 820 over a Bluetooth connection. The Bluetooth host 811 is coupled to the WLAN host 812 and WLAN firmware 813, and may be coupled to other components of a WLAN subsystem (not shown in FIG. 8A for simplicity) of the wireless device 810. The WLAN host 812 and WLAN firmware 813 may be used to format, encode, and transmit WLAN-compliant packets (such as one or more of the PPDUs described in the IEEE 802.11 family of wireless communication standards) to the peripheral device 820 over a WLAN link. The WLAN host 812 and WLAN firmware 813 may also be used to decode packets received from the peripheral device 820 over the WLAN link.

As discussed, the ability to transmit data, particularly latency-sensitive traffic, to the peripheral device 820 over the WLAN link may reduce latencies and increase throughput as compared to transmitting data to the peripheral device 820 over the Bluetooth connection. In some instances, the WLAN link may become congested or subject to interference that can increase latencies and degrade throughput on the WLAN link. In these instances, the wireless device 810 may determine that the Bluetooth connection provides a better medium for communicating with the peripheral device 820 than the WLAN link. In other instances, a traffic stream being transmitted from the wireless device 810 to the peripheral device 820 may end, and power consumption of the wireless device 810 may be reduced by handing over communications with the peripheral device 820 from the WLAN link to the Bluetooth connection. In these and other instances, the wireless device 810 may handover communications with the peripheral device 820 from the WLAN link to the Bluetooth connection in a manner that reduces latencies associated with the handover operation while also minimizing power consumption of the wireless device 810 and the peripheral device 820.

For example, at time $t_1$, the Bluetooth host 811 may initiate the handover operation by sending a Fetch message to the WLAN host 812. The Fetch message may request the next target beacon transmission times (TBTTs) and the next beacon interval (BI) to be used for transmitting beacon frames over the WLAN link during the sleep state. In some instances, the Fetch message may indicate that the Bluetooth host 811 intends to handover communications with the peripheral device 820 from the WLAN link to the Bluetooth connection, and that the Bluetooth host 811 intends to enter the softAP into a sleep state after the handover operation. The WLAN host 812 receives the Fetch message, and forwards the Fetch message to the WLAN firmware 813.

The WLAN firmware 813 receives the Fetch message, and may place one or more associated WLAN components into the sleep state, for example, to reduce power consumption of the wireless device 810. If there is an active TWT session with the peripheral device 820, the WLAN firmware 813 may tear down the active TWT session by transmitting a TWT teardown frame to the peripheral device 820 over the WLAN link. The peripheral device 820 receives the TWT teardown frame, and terminates its participation in the TWT session.

The WLAN firmware 813 selects, determines, or otherwise obtains a beacon interval to be used during the sleep state. The sleep state beacon interval, denoted herein as $BI_{sleep}$, may be longer than the beacon interval specified by the IEEE 802.11 family of wireless communication standards for beacon frame transmissions in a WLAN, denoted herein as $BI_{WLAN}$. Since the duration of $BI_{sleep}$ is longer than the duration of $BI_{WLAN}$, the wireless device 810 may transmit beacon frames over the WLAN link during the sleep state less frequently than when operating in the active power state. In some implementations, the duration of $BI_{sleep}$ may be an order of magnitude (or more) greater than the duration of $BI_{WLAN}$. For example, while the duration of $BI_{WLAN}$ specified by the IEEE 802.11 family of wireless communication standards is approximately 100 milliseconds (ms), a duration between 1-2 seconds (or more) may be selected for $BI_{sleep}$. Thus, the wireless device 810 may broadcast beacon frames over the WLAN link every 100 ms during the active power state, and may broadcast beacon frames over the WLAN link every 1-2 seconds during the sleep state, thereby reducing power consumption associated with beacon frame transmissions during the sleep state.

For example, when $BI_{sleep}$ is set to 1 second, the wireless device 810 may broadcast 15 beacon frames over the WLAN link within a 15 second time period during the sleep state, as compared with broadcasting 150 beacon frames over the WLAN link within the same 15 second time period during the active power state. For another example, when $BI_{sleep}$ is set to 1.5 seconds, the wireless device 810 may broadcast 10 beacon frames over the WLAN link within the 15 second time period during the sleep state, as compared with broadcasting 150 beacon frames over the WLAN link within the same 15 second time period during the active power state. For yet another example, when $BI_{sleep}$ is set to 2 seconds, the wireless device 810 may broadcast 7 or 8 beacon frames over the WLAN link within the 15 second time period during the sleep state, as compared with broadcasting 150 beacon frames over the WLAN link within the same 15 second time period during the active power state.

In some implementations, the WLAN firmware 813 may use the selected or obtained value of $BI_{sleep}$ to determine the TBTTs for the WLAN link during the sleep state. For example, the WLAN firmware 813 may obtain the current timing synchronization function (TSF) value of the wireless device 810, and determine the TBTTs for the WLAN link during the sleep state based on the current TSF value and $BI_{sleep}$. Specifically, while the TBTTs for the WLAN link during the active power state (denoted herein as $TBTT_{WLAN}$) are separated in time by approximately 100 ms, the TBTTs for the WLAN link during the sleep state (denoted herein as $TBTT_{sleep}$) are separated in time by the value of $BI_{sleep}$, which as discussed above may be an order of magnitude longer than $TBTT_{WLAN}$. In some aspects, the WLAN firmware 813 may use the current TSF value to align the next $TBTT_{sleep}$ with a corresponding $TBTT_{WLAN}$, for example, such that the TSF-based values of $TBTT_{sleep}$ are aligned with corresponding $N^{th}$ TSF-based values of $TBTT_{WLAN}$, where $N=TBTT_{sleep}/TBTT_{WLAN}$).

At time $t_2$, the WLAN firmware 813 sends a response message to the Bluetooth host 811. The response message may carry or indicate the values of $TBTT_{sleep}$ and $BI_{sleep}$. In some aspects, the response message may also carry or indicate the value of $BI_{WLAN}$. The Bluetooth host 811 receives the response message, and updates its beacon frame transmission information to include the received values of $TBTT_{sleep}$ and $BI_{sleep}$.

At time $t_3$, the Bluetooth host 811 sends an update BI message to the WLAN host 812. The update BI message may carry or indicate the values of $TBTT_{sleep}$ and $BI_{sleep}$, and may signal the intention of the Bluetooth host 811 to place the softAP into the sleep state. The WLAN host 812 forwards the update BI message to the WLAN firmware 813, which responds by sending an update BI status message to the Bluetooth host 811 at time $t_4$. The update BI status message may indicate that the beacon frame transmission information in the WLAN firmware 813 has been updated with the values of $TBTT_{sleep}$ and $BI_{sleep}$, thereby signaling that the WLAN firmware 813 is ready to handover communications from the WLAN link to the Bluetooth connection while maintaining the WLAN link in an active state during the sleep state. The Bluetooth host 811 receives the update BI status message, and enters the softAP into the sleep state between times $t_4$ and $t_5$.

At time $t_5$, the Bluetooth host 811 transmits a first message to the peripheral device 820 over the Bluetooth connection. The first message carries or indicates the values of next $TBTT_{sleep}$ and $BI_{sleep}$ relative to the current TSF value of the wireless device 810. In some instances, the first message may also carry or indicate the most-recent value of $BI_{WLAN}$. In this way, the Bluetooth host 811 may use the Bluetooth connection as a side-channel to send control signals and timing information (such as next $TBTT_{sleep}$ and $BI_{sleep}$) to the peripheral device 820, for example, so that the wireless device 810 and the peripheral device 820 are able to maintain the WLAN link in an active state when the softAP and the peripheral device 820 enter the sleep state.

The peripheral device 820 receives the first message, and updates its beacon frame transmission information with the values of next $TBTT_{sleep}$ and $BI_{sleep}$. The peripheral device 820 also places one or more associated WLAN components into the sleep state, for example, to reduce power consumption of the peripheral device 820. In some instances, the first earbud may be the primary earbud, and the second earbud may be the secondary earbud, for example, as depicted in the example of FIG. 8A. In such instances, the first earbud receives the first message, and updates its beacon frame transmission information with the values of next $TBTT_{sleep}$ and $BI_{sleep}$. The first earbud sends an update TBTT/BI message carrying the values of next $TBTT_{sleep}$ and $BI_{sleep}$ to the second earbud, and places its associated WLAN components into the sleep state. The second earbud receives the update TBTT/BI message from the first earbud, updates its beacon frame transmission information with the values of next $TBTT_{sleep}$ and $BI_{sleep}$, and places its associated WLAN components into the sleep state. As depicted in the example of FIG. 8A, both the first and second earbuds of the peripheral device 820 enter the sleep state between times $t_5$ and $t_6$.

While the softAP is in the sleep state, the wireless device 810 transmits beacon frames over the WLAN link based on the values of next $TBTT_{sleep}$ and $BI_{sleep}$. The first and second earbuds wake-up during the sleep state based on the $TBTT_{Ssleep}$ to listen for beacon frames transmitted over the WLAN link by the wireless device 810. In some instances, the Bluetooth host 811 may prompt the WLAN subsystem of the wireless device 810 to transmit beacon frames over the WLAN link while the softAP is in the sleep state. For example, at time $t_6$, the Bluetooth host 811 sends a power save (PS) ping REQ message to the WLAN host 812, which forwards the PS ping REQ message to the WLAN firmware 813. The PS ping REQ message may signal that the WLAN firmware 813 is to maintain the WLAN link in the active state during the sleep state by transmitting beacon frames to the peripheral device 820 over the WLAN link.

In some implementations, the Bluetooth host 811 may send the PS ping REQ message to the WLAN firmware 813 prior to the first $TBTT_{sleep}$ by a time period (T) equal to five times the sleep state beacon interval (e.g., $T=5*BI_{sleep}$). For example, when $BI_{sleep}=1$ second, the Bluetooth host 811 may send one or more PS ping REQ messages to the WLAN firmware 813 at least 5 seconds before the first $TBTT_{sleep}$. In some instances, the time period T may be based on a Length Supervision Time-Out (LSTO) period used in Bluetooth communications to determine when a particular Bluetooth link has become inactive. Since the softAP, and thus the Bluetooth stack implemented therein, are in the sleep state, the Bluetooth host 811 maintains the LSTO counter on behalf of the softAP and uses PS ping messages exchanged with the WLAN firmware 813 to determine whether the WLAN link has been inactive for more than the LSTO period. In some aspects, the LSTO period is set to 30 seconds, and the Bluetooth host 811 sends one or more PS ping REQ messages to the WLAN firmware 813 at a time=30 seconds−5*$BI_{sleep}$=25 seconds before expiration of the LSTO period.

At time $t_7$, the WLAN firmware 813 responds to the PS ping REQ message by transmitting a beacon frame over the WLAN link to the peripheral device 820. The beacon frame may carry a Traffic Indication Map (TIM) bit set to 1, for example, so that the peripheral device 820 remains awake from the sleep state for an extended duration of time. The peripheral device 820 wakes-up at or before time $t_7$, receives the beacon frame, and responds by transmitting a NULL frame to the wireless device 810 over the WLAN link at time $t_8$. In some aspects, the NULL frame may carry a Power Management (PM) bit set to 0, for example, to indicate that the peripheral device 820 is in the sleep state.

At time $t_9$, the wireless device 810 responds to the NULL frame by transmitting a ping REQ frame to the peripheral device 820 over the WLAN link. The peripheral device 820 receives the ping REQ frame, and responds at time $t_{10}$ by transmitting a ping RESP frame to the wireless device 810 over the WLAN link. For instances in which the peripheral device 820 includes first and second earbuds, as depicted in the example of FIG. 8A, each of the first and second earbuds may transmit a ping RESP frame to the wireless device 810 over the WLAN link. In some implementations, each of the ping REQ and ping RESP frames may be a transmission control protocol/internet protocol (TCP/IP) frame pre-pended with a Bluetooth header and encapsulated within a WLAN-compliant PPDU. In this way, the ping REQ frames may be transmitted over the WLAN link by the Bluetooth PHY associated with the wireless device 810, and the ping RESP frames may be transmitted over the WLAN link by the respective Bluetooth PHYs associated with the first and second earbuds.

At time $t_{11}$, the WLAN firmware 813 sends a ping status message to the Bluetooth host 811. The ping status message may indicate that at least one ping RESP frame was received from the peripheral device 820, and that the WLAN link remains in the active state while the wireless device 810 and the peripheral device 820 use the Bluetooth connection for exchanging data packets with each other.

At time $t_{12}$, the wireless communication 800 continues with the Bluetooth host 811 sending another PS ping REQ message to the WLAN host 812, which forwards the PS ping REQ message to the WLAN firmware 813. In response thereto, the WLAN firmware 813 transmits another beacon frame over the WLAN link to the peripheral device 820 at time $t_{13}$. As discussed, the time period (T) between times $t_{12}$ and $t_{13}$ may be expressed as T=5*$BI_{sleep}$. Thereafter, the wireless communication 800 continues in the manner described above.

Figure 8B:
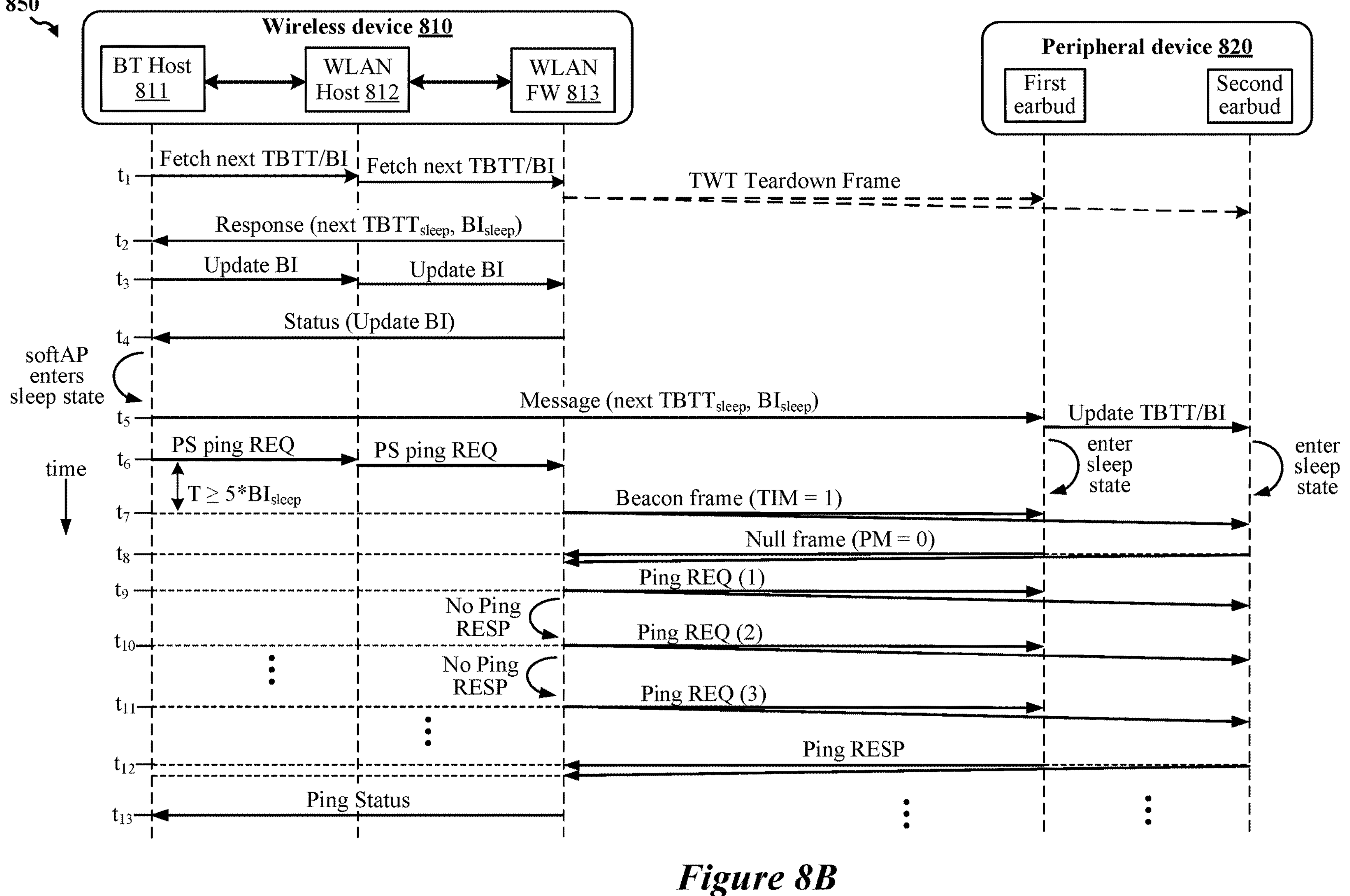
FIG. 8B shows a sequence diagram depicting another example wireless communication that supports a wireless device and a peripheral device entering a sleep state, according to various aspects of the present disclosure.

FIG. 8B shows a sequence diagram depicting another example wireless communication 850 that supports a wireless device and a peripheral device entering a sleep state, according to various aspects of the present disclosure. The wireless communication 850 may be performed between the wireless device 810 and the peripheral device 820 described with reference to FIG. 8A. The wireless communication 850 is similar to the wireless communication 800 of FIG. 8A, except that after transmitting a first ping REQ frame to the peripheral device 820 at time $t_9$, the WLAN firmware 813 does not receive a ping RESP frame from the peripheral device 820.

For example, in response to an absence of a ping RESP frame from the peripheral device 820, the WLAN firmware 813 transmits a second ping REQ frame over the WLAN link to the peripheral device 820, at time $t_{10}$. The WLAN firmware 813 does not detect a ping RESP frame transmitted by the peripheral device 820 in response to the second ping REQ frame, and transmits a third ping REQ frame over the WLAN link to the peripheral device 820, at time $t_{11}$. In the example of FIG. 8B, the peripheral device 820 receives the third ping REQ frame, and transmits a ping RESP frame over the WLAN link to the wireless device 810, at time $t_{12}$. For instances in which the peripheral device 820 includes first and second earbuds, as depicted in the example of FIG. 8B, each of the first and second earbuds may transmit a ping RESP frame to the wireless device 810 over the WLAN link at time $t_{12}$. As discussed, in some instances, each of the ping REQ and ping RESP frames may be a TCP/IP frame pre-pended with a Bluetooth header and encapsulated within a WLAN-compliant PPDU.

In response to receiving the ping RESP frames, the WLAN firmware 813 sends a ping status message to the Bluetooth host 811. The ping status message may indicate that a ping RESP frame was received from the peripheral device 820, and that the WLAN link remains in the active state while the wireless device 810 and the peripheral device 820 use the Bluetooth connection for exchanging data packets with each other. In some aspects, transmission of the second ping REQ frame may be offset in time from transmission of the first ping REQ request by the value of $BI_{sleep}$, and transmission of the third ping REQ frame may be offset in time from transmission of the second ping REQ request by the value of $BI_{sleep}$.

Figure 9:
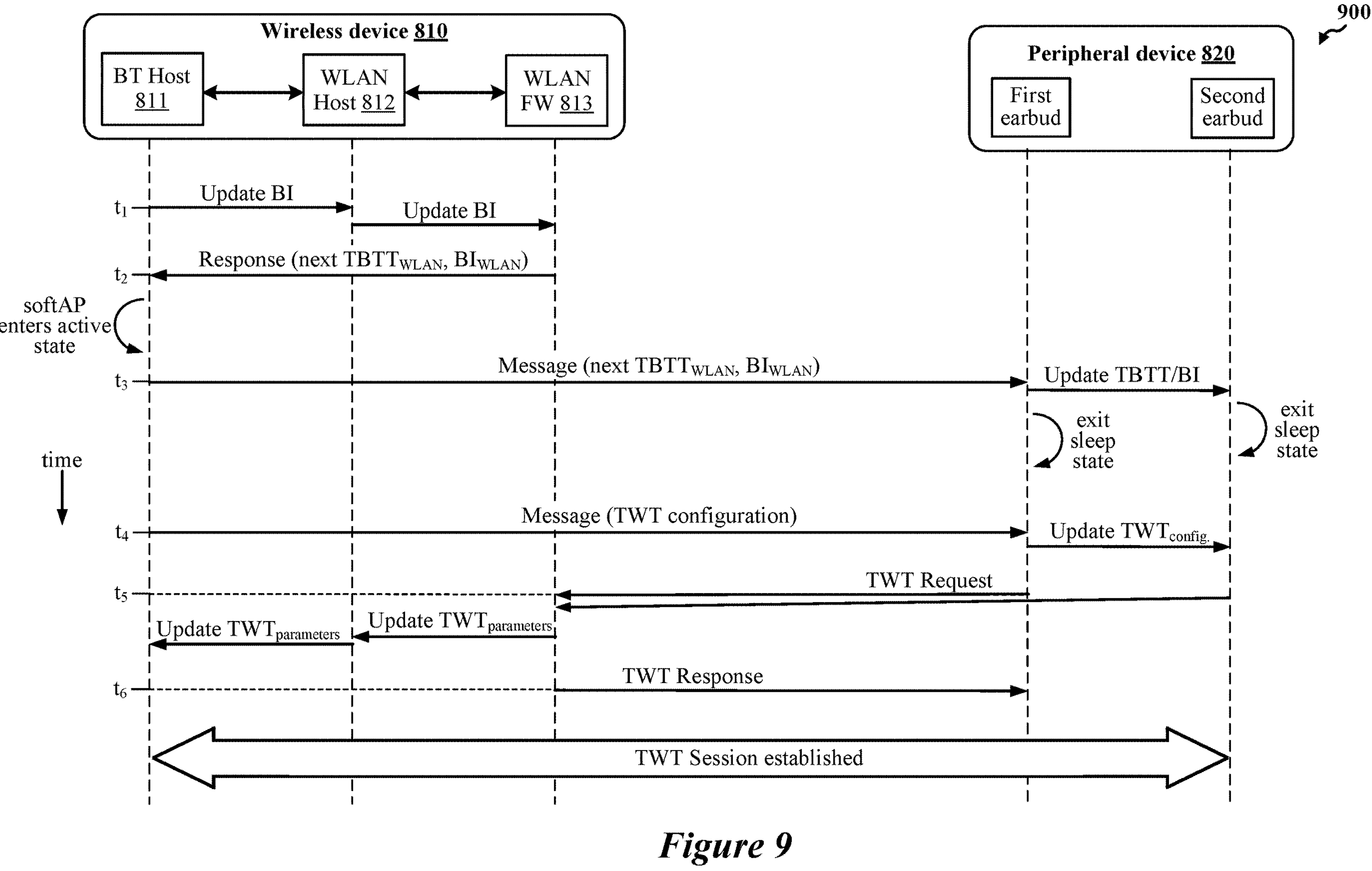
FIG. 9 shows a sequence diagram depicting an example wireless communication that supports a wireless device and a peripheral device exiting a sleep state, according to various aspects of the present disclosure.

FIG. 9 shows a sequence diagram depicting an example wireless communication 900 that supports a wireless device and a peripheral device exiting a sleep state, according to some implementations. The wireless communication 900 may be performed between the wireless device 810 and the peripheral device 820 described with reference to FIGS. 8A-8B. In the example of FIG. 9, the wireless device 810 initiates a handover operation from the Bluetooth connection to the WLAN link in conjunction with exiting the sleep state, and may synchronize the exit of the peripheral device 820 from the sleep state with the exit of the softAP from the sleep state.

For example, at time $t_1$, the Bluetooth host 811 sends an update BI message to the WLAN host 812. The update BI message may carry or indicate values of the TBTTs and the beacon interval (e.g., next $TBTT_{WLAN}$ and $BI_{WLAN}$) to be used for beacon frame transmissions over the WLAN link after the handover operation. In some instances, the update BI message may indicate that the Bluetooth host 811 intends to handover communications with the peripheral device 820 from the Bluetooth connection to the WLAN link, and that the Bluetooth host 811 intends to exit the softAP from the sleep state. The WLAN host 812 receives the update BI message, and forwards the update BI message to the WLAN firmware 813.

The WLAN firmware 813 receives the update BI message, and exits its WLAN components from the sleep state. The WLAN firmware 813 obtains the values of next $TBTT_{WLAN}$ and $BI_{WLAN}$, and sends a response message to the Bluetooth host 811 at time $t_2$. The response message may carry or indicate the values of next $TBTT_{WLAN}$ and $BI_{WLAN}$. In some instances, the response message may also carry or indicate the value of $BI_{sleep}$. The Bluetooth host 811 receives the response message, and updates its beacon frame transmission information with the values of next $TBTT_{WLAN}$ and $BI_{WLAN}$.

At time $t_3$, the Bluetooth host 811 transmits a second message to the peripheral device 820 over the Bluetooth connection. The second message carries or indicates the values of next $TBTT_{WLAN}$ and $BI_{WLAN}$ relative to the current TSF value of the wireless device 810. In some instances, the second message may also carry or indicate the most-recent value of $BI_{sleep}$. In this way, the Bluetooth host 811 may use the Bluetooth connection as a side-channel to send control signals and timing information (such as next $TBTT_{WLAN}$ and $BI_{WLAN}$) to the peripheral device 820, for example, so that the wireless device 810 and the peripheral device 820 are able to communicate with each other over the WLAN link after the handover operation.

The peripheral device 820 receives the second message, and updates its beacon frame transmission information with the values of next $TBTT_{WLAN}$ and $BI_{WLAN}$. In some instances, the first earbud may be the primary earbud, and the second earbud may be the secondary earbud, for example, as depicted in the example of FIG. 9. In such instances, the first earbud receives the second message, updates its beacon frame transmission information with the values of next $TBTT_{WLAN}$ and $BI_{WLAN}$, and sends an update TBTT/BI message carrying the values of next $TBTT_{WLAN}$ and $BI_{WLAN}$ to the second earbud. The first earbud may exit the sleep state after updating its beacon frame transmission information, for example, by placing its WLAN components into the active power state. The second earbud receives the update TBTT/BI message from the first earbud, updates its beacon frame transmission information with the values of next $TBTT_{WLAN}$ and $BI_{WLAN}$, and then exits the sleep state by placing its WLAN components into the active power state. As depicted in the example of FIG. 9, both the first and second earbuds of the peripheral device 820 exit the sleep state between times $t_3$ and $t_4$.

In some instances, the wireless device 810 may re-enable TWT sessions on the WLAN link with the peripheral device 820 by sending TWT configuration information to the peripheral device 820 over the Bluetooth connection. For example, at time $t_4$, the Bluetooth host 811 sends a TWT configuration message over the Bluetooth connection to the peripheral device 820. The TWT configuration message may carry or indicate various TWT parameters and other information associated with requesting a TWT session. The peripheral device 820 receives the TWT configuration message, obtains the TWT parameters and other information, and transmits a TWT request frame over the WLAN link to the wireless device 810, at time $t_5$.

The WLAN firmware 813 receives the TWT request frame, and sends an update message carrying the TWT information to the WLAN host 812. The WLAN host 812 forwards the update message to the Bluetooth host 811, which updates its TWT information with the TWT information carried or indicated in the update message. The WLAN firmware 813 also transmits a TWT response frame over the WLAN link to the peripheral device 820, at time $t_6$. Thereafter, a TWT session may be established between the wireless device 810 and the peripheral device 820.

Figure 10A:
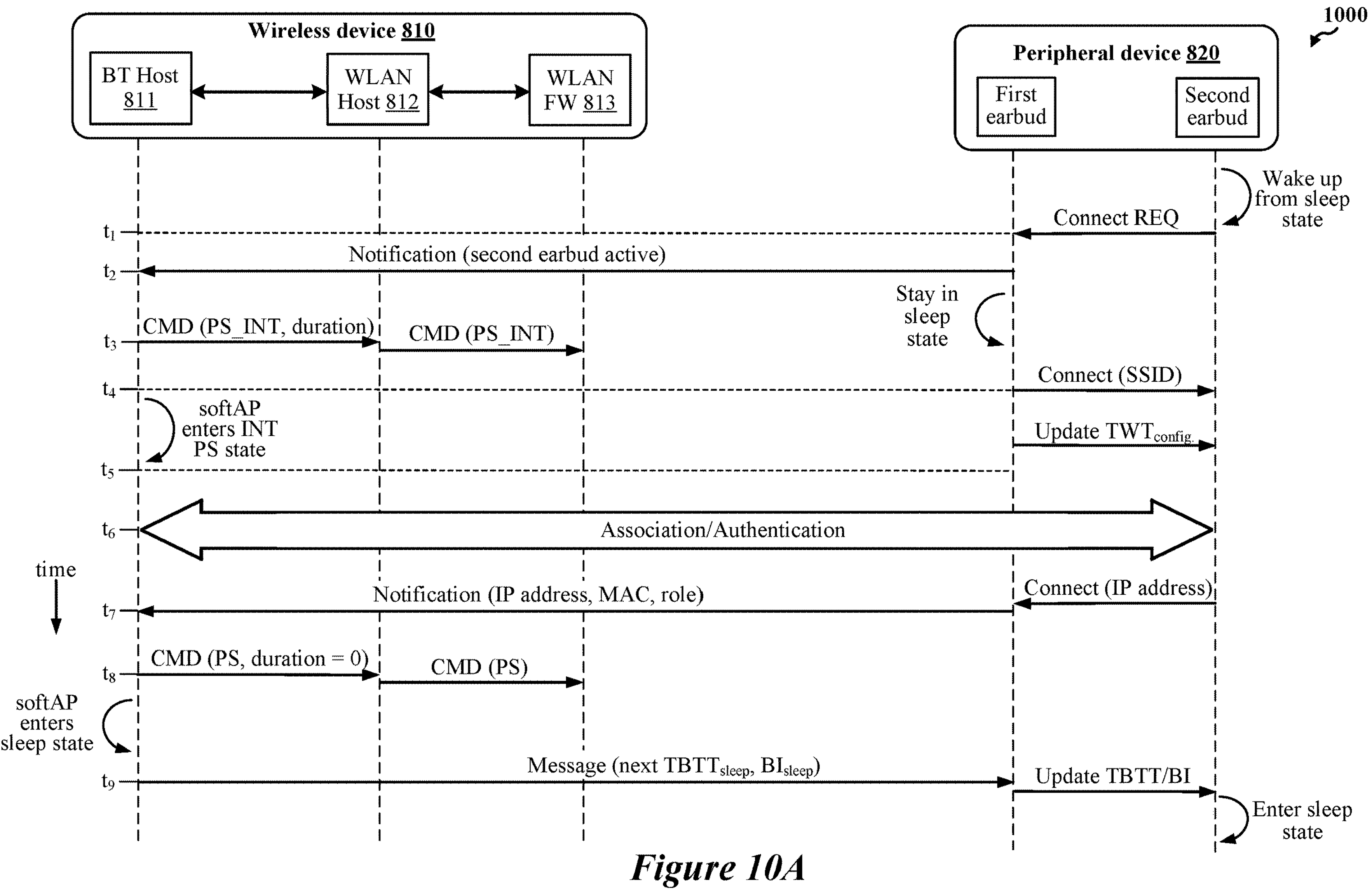
FIG. 10A shows a sequence diagram depicting an example wireless communication that supports a wireless device receiving a connection request from a peripheral device while in a sleep state, according to various aspects of the present disclosure.

FIG. 10A shows a sequence diagram depicting an example wireless communication 1000 that supports establishing a connection between a wireless device and a peripheral device during a sleep state, according to some implementations. The wireless communication 1000 may be performed between the wireless device 810 and the peripheral device 820 described with reference to FIGS. 8A, 8B, and 9. In some implementations, the wireless communication 1000 may be performed in conjunction with the example wireless communication 900 of FIG. 9.

In the example of FIG. 10A, the first earbud wake ups and exits the sleep state in response to receiving the second message described with reference to FIG. 9, and the second earbud does not wake up until after the first earbud is actively associated with the softAP over the WLAN link. For example, the second earbud wakes up and sends a connect REQ message to the first earbud, at time $t_1$. In response thereto, the first earbud sends a notification message over the Bluetooth connection to the Bluetooth host 811, at time $t_2$. The notification message may indicate that the second earbud is awake and requests association with the softAP.

At time $t_3$, the Bluetooth host 811 responds to the notification message by sending a command to the WLAN host 812, which forwards the command to the WLAN firmware 813. The command may carry instructions for the softAP to transition to an intermediate power state during which the softAP does not change the TBTTs or the beacon interval used for transmitting beacon frames over the WLAN link, for example, thereby allowing the first earbud to remain synchronized and associated with the softAP. In some instances, command may indicate a duration of time for the softAP to remain in the intermediate power state. In some aspects, the duration may be set to 3 seconds.

At time $t_4$, the softAP enters the intermediate power state for the duration indicated in the command, and listens for connection requests from the second earbud. The first earbud sends a connect message to the second earbud that carries or indicates the SSID of the softAP. In some instances, the first earbud may also send an update TWT message to the second earbud. The update TWT message may carry or indicate various TWT parameters and other information associated with requesting or joining a TWT session established on the WLAN link.

At time $t_6$, the second earbud and the softAP perform association and authentication operations with each other, after which the second earbud may be synchronized and associated with the softAP.

At time $t_7$, the second earbud sends a connect message to the first earbud over the Bluetooth connection. The connect message may carry or indicate the IP address of the softAP. In response thereto, the first earbud sends a notification message over the Bluetooth connection to the Bluetooth host 811. The notification message may carry or indicate the IP address of the softAP, the MAC address of the softAP, and the role of the second earbud.

At time $t_8$, the Bluetooth host 811 responds to the notification message by sending a PS command to the WLAN host 812, which forwards the PS command to the WLAN firmware 813. The PS command may include instructions for the softAP to return to the sleep state, and may carry or indicate a duration set to 0. The softAP may return to the sleep state after time $t_8$.

At time $t_9$, the Bluetooth host 811 sends a message to the peripheral device 820 over the WLAN link. The message may carry or indicate the values of $TBTT_{sleep}$ and $BI_{sleep}$. For instances in which the peripheral device 820 includes first and second earbuds, as depicted in the example of FIG. 10A, the first earbud may send an update TBTT/BI message to the second earbud over the Bluetooth connection. The second earbud updates its beacon frame transmission information with the received values of $TBTT_{sleep}$ and $BI_{sleep}$, and then enters the sleep state. Thereafter, both the first and second earbuds of the peripheral device 820 are associated with the softAP via the WLAN link, and are also paired with the softAP via the Bluetooth connection. As such, the wireless device 810 and the peripheral device 820 may exchange data packets with each other using one or both of the WLAN link and the Bluetooth connection.

Figure 10B:
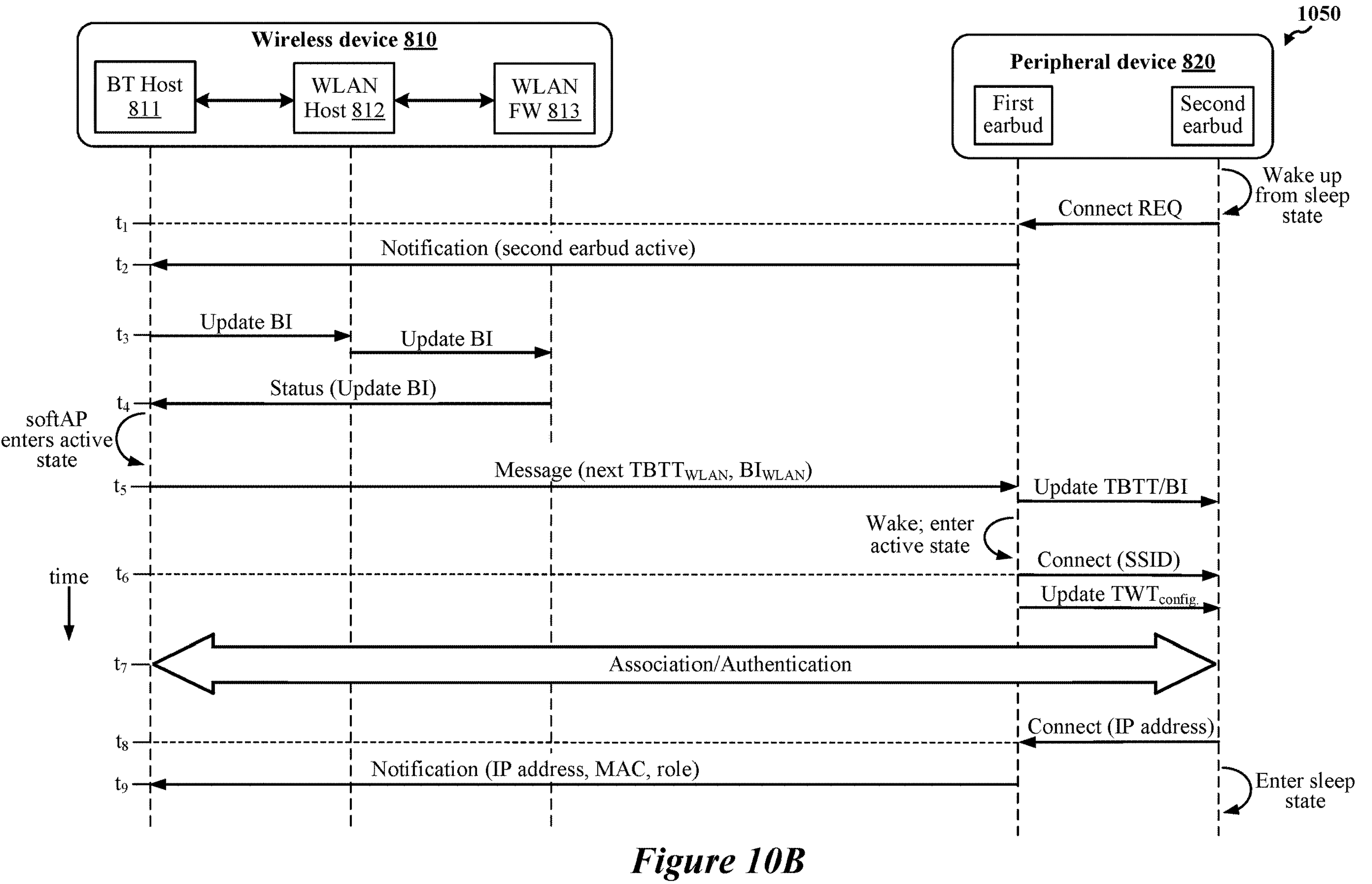
FIG. 10B shows a sequence diagram depicting an example wireless communication that supports a wireless device receiving a connection request from a peripheral device while in a sleep state, according to other implementations.

FIG. 10B shows a sequence diagram depicting another example wireless communication 1050 that supports establishing a connection between a wireless device and a peripheral device during a sleep state, according to other implementations. In some implementations, the wireless communication 1050 may be performed between the wireless device 810 and the peripheral device 820 described with reference to FIGS. 8A, 8B, and 9. In some implementations, the wireless communication 1050 may be performed in conjunction with the example wireless communication 900 of FIG. 9.

In the example of FIG. 10B, the first earbud wake ups and exits the sleep state in response to receiving the second message described with reference to FIG. 9, and the second earbud does not wake up until after the first earbud is actively associated with the softAP over the WLAN link. For example, the second earbud wakes up and sends a connect REQ message to the first earbud, at time $t_1$. In response thereto, the first earbud sends a notification message over the Bluetooth connection to the Bluetooth host 811, at time $t_2$. The notification message may request the power state of the softAP, and in some instances, may also indicate that the second earbud is awake.

At time $t_3$, the Bluetooth host 811 responds to the notification message by sending an update BI message to the WLAN host 812, which forwards the update BI message to the WLAN firmware 813. The update BI message may carry or indicate values of $TBTT_{sleep}$ and $BI_{sleep}$. The WLAN firmware 813 responds by sending an update BI status message to the Bluetooth host 811 at time $t_4$. The update BI status message may indicate that the beacon frame transmission information in the WLAN firmware 813 has been updated with the values of $TBTT_{sleep}$ and $BI_{sleep}$. The Bluetooth host 811 receives the update BI status message, and enters the softAP into the active power state after time $t_4$.

At time $t_5$, the Bluetooth host 811 transmits a message to the peripheral device 820 over the Bluetooth connection. The message may carry or indicate the values of next $TBTT_{sleep}$ and $BI_{sleep}$ relative to the current TSF value of the wireless device 810. In some instances, the message may also carry or indicate the most-recent value of $BI_{WLAN}$. In this way, the Bluetooth host 811 may use the Bluetooth connection as a side-channel to send control signals and timing information (such as next TBTT sleep and $BI_{sleep}$) to the second earbud via the first earbud, for example, so that the second earbud can associate with the softAP over the WLAN link.

The first earbud receives the message, wakes up from the sleep state, and enters the active power state. The first earbud updates its beacon frame transmission information with the values of next $TBTT_{sleep}$ and $BI_{sleep}$, and sends an update BI message carrying the values of next $TBTT_{sleep}$ and $BI_{sleep}$ to the second earbud, which updates its beacon frame transmission information with the values of next $TBTT_{sleep}$ and $BI_{sleep}$.

At time $t_6$, the first earbud sends a connect message to the second earbud over the Bluetooth connection. The connect message may carry or indicate the SSID of the softAP. In some instances, the first earbud may also send an update TWT message to the second earbud. The update TWT message may carry or indicate various TWT parameters and other information associated with requesting or joining a TWT session established on the WLAN link.

At time $t_7$, the second earbud and the softAP perform association and authentication operations with each other, after which the second earbud may be synchronized and associated with the softAP.

At time $t_8$, the second earbud sends a connect message to the first earbud over the Bluetooth connection. The connect message may carry or indicate the IP address of the softAP. In response thereto, the first earbud sends a notification message over the Bluetooth connection to the Bluetooth host 811, at time $t_9$. The notification message may carry or indicate the IP address of the softAP, the MAC address of the softAP, and the role of the second earbud. Thereafter, both the first and second earbuds of the peripheral device 820 are associated with the softAP via the WLAN link, and are also paired with the softAP via the Bluetooth connection. As such, the wireless device 810 and the peripheral device 820 may exchange data packets with each other using one or both of the WLAN link and the Bluetooth connection.

Figure 11:
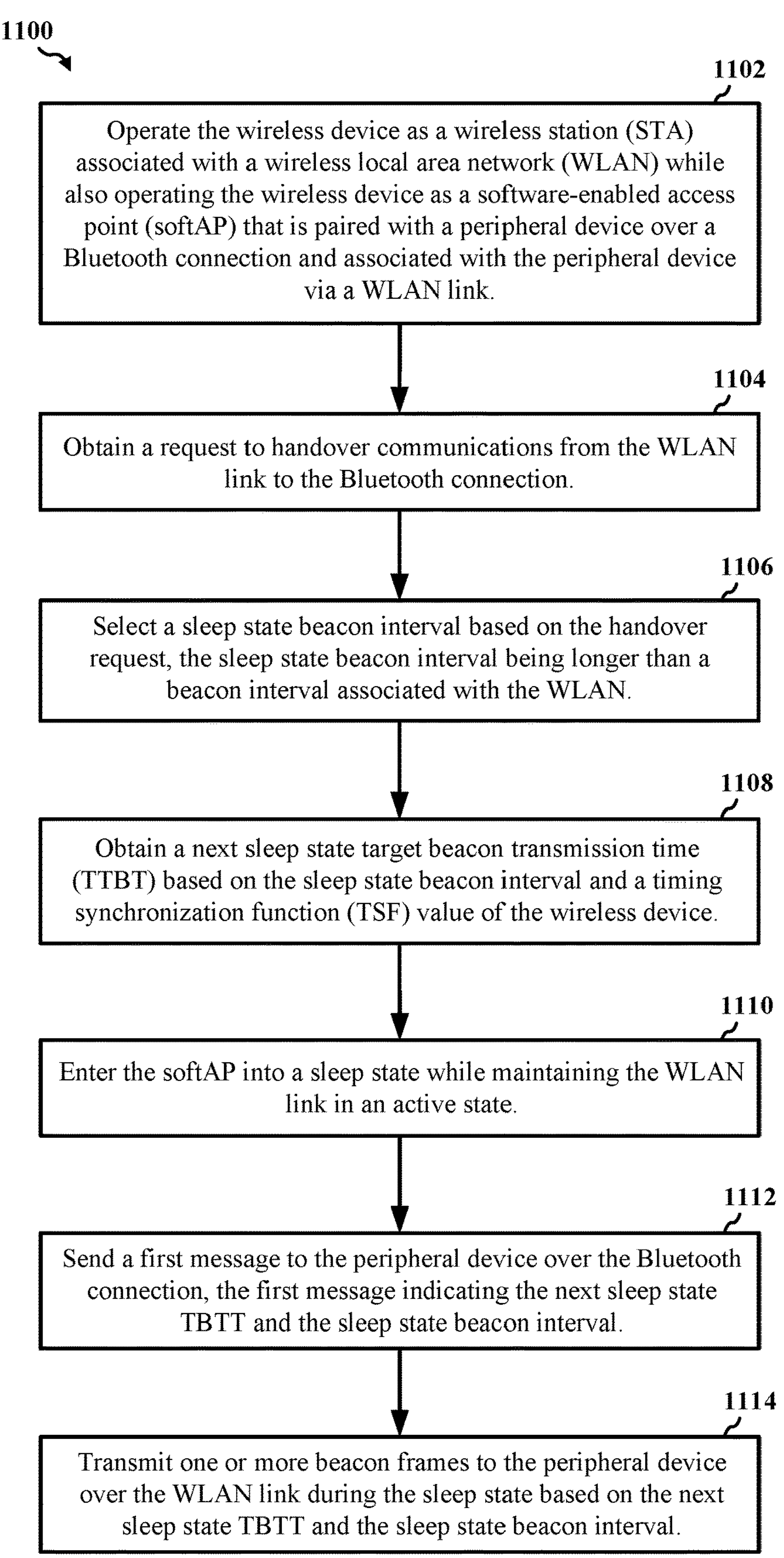
FIG. 11 shows a flowchart illustrating an example operation for wireless communication that supports a wireless device and a peripheral device entering a sleep state, according to various aspects of the present disclosure.

FIG. 11 shows a flowchart illustrating an example operation for wireless communication that supports a wireless device and a peripheral device entering a sleep state, according to various aspects of the present disclosure. The operation 1100 may be performed by a wireless device such as the central device 102 of FIG. 1, the wireless device 200 of FIG. 2, the wireless device 610 of FIG. 6, or the wireless device 700 of FIG. 7. In some implementations, the operation 1100 may be performed by a wireless device that can operate as a STA while also operating as a softAP that is paired with a peripheral device over a Bluetooth connection and associated with the peripheral device via a WLAN link. In various implementations, the wireless device may be a smartphone, handset, or other suitable device that can send audio, video, and other traffic streams to the peripheral device. In some implementations, the peripheral device may be or may include headphones, headsets, earbuds, or other remote devices. In some instances, the peripheral device may be an example of one or more of the peripheral devices 104, 106, 108, 110, 112, or 114 of FIG. 1, the earbuds 420 of FIGS. 4A-4B, the earbuds 520 of FIGS. 5A-5B, or the peripheral device 620 of FIGS. 6 and 7.

For example, at 1102, the wireless device operates as a STA associated with a WLAN while also operating as a softAP that is paired with a peripheral device over a Bluetooth connection and associated with the peripheral device via a WLAN link. At 1104, the wireless device obtains a request to handover communications from the WLAN link to the Bluetooth connection. At 1106, the wireless device selects a sleep state beacon interval based on the handover request, the sleep state beacon interval being longer than a beacon interval associated with the WLAN. At 1108, the wireless device obtains a next sleep state TBTT based on the sleep state beacon interval and a TSF value of the wireless device. At 1110, the wireless device enters the softAP into a sleep state while maintaining the WLAN link in an active state. At 1112, the wireless device sends a first message to the peripheral device over the Bluetooth connection, the first message indicating the next sleep state TBTT and the sleep state beacon interval. At 1114, the wireless device transmits one or more beacon frames to the peripheral device over the WLAN link during the sleep state based on the next sleep state TBTT and the sleep state beacon interval.

In various implementations, the peripheral device includes a first earbud and a second earbud, each of the first earbud and the second earbud being associated with the softAP, and each of the first earbud and the second earbud being paired with the softAP via the Bluetooth connection. In some instances, the WLAN link includes one or more wireless channels in a 2.4 GHz frequency band, a 5 GHz frequency band, or a 6 GHz frequency band. In other instances, the WLAN link includes at least one of a peer-to-peer (P2P) link, a tunneled direct-link setup (TDLS) link, a Wi-Fi Direct link, a link associated with a Group Owner (GO), or a link associated with a Neighborhood Area Network (NAN).

In some implementations, the sleep state beacon interval may be an order of magnitude longer than the beacon interval specified by the IEEE 802.11 family of wireless communication standards. Thus, while the beacon interval specified by the IEEE 802.11 family of wireless communication standards is approximately 100 ms, the sleep state beacon interval may be on the order of 1 second or more. For example, in some instances, the sleep state beacon interval may be 1 second, and thus the wireless device may broadcast 15 beacon frames over the WLAN link within a 15 second time period, as compared with broadcasting 150 beacon frames over the WLAN link within the same 15 second time period using the beacon interval specified by the IEEE 802.11 family of wireless communication standards. For another example, the sleep state beacon interval may be 1.5 seconds, and thus the wireless device may broadcast 10 beacon frames over the WLAN link within the 15 second time period.

Figure 12:
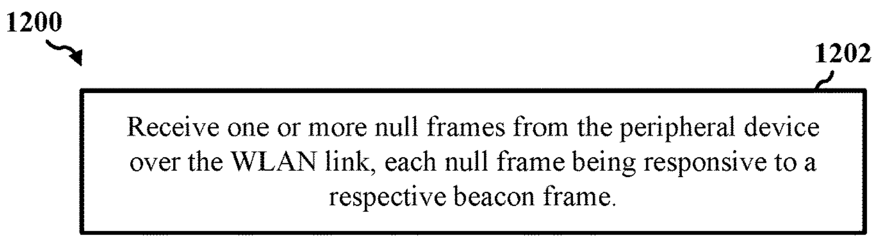
FIG. 12 shows a flowchart illustrating another example operation for wireless communication that supports a wireless device and a peripheral device entering a sleep state, according to various aspects of the present disclosure.

FIG. 12 shows a flowchart illustrating another example operation 1200 for wireless communications that support a wireless device and a peripheral device entering a sleep state, according to various aspects of the present disclosure. In some instances, the operation 1200 may be performed after transmitting the one or more beacon frames at 1114 of FIG. 11. For example, at 1202, the wireless device receives one or more null frames from the peripheral device over the WLAN link, each null frame being responsive to a respective beacon frame. In some instances, each beacon frame includes a traffic indication map (TIM) bit set to 1. In this way, the peripheral device, and other clients or STAs associated with the wireless device, wake-up from the sleep state (or delay entering the sleep state) to listen for and receive the next beacon frame transmission. In addition, each Null frame may include a PM bit=0 to indicate that the peripheral device is in an active state.

Figure 13:
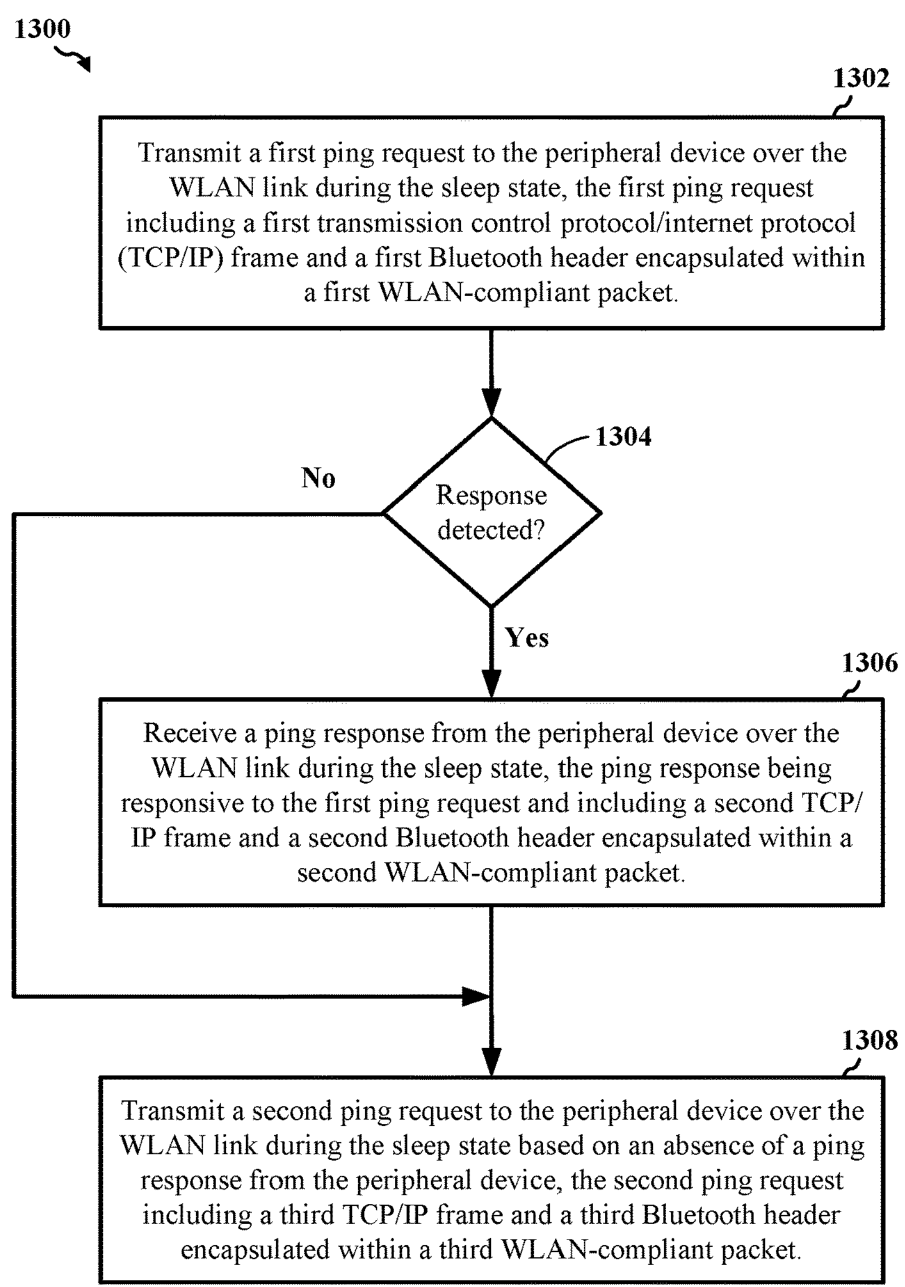
FIG. 13 shows a flowchart illustrating an example operation for wireless communication that supports a wireless device maintaining an active WLAN link with a peripheral device, according to various aspects of the present disclosure.

FIG. 13 shows a flowchart illustrating an example operation 1300 for wireless communication that supports a wireless device maintaining an active WLAN link with a peripheral device, according to various aspects of the present disclosure. In some instances, the operation 1300 may be performed after transmitting the one or more beacon frames at 1114 of FIG. 11. For example, at 1302, the wireless device transmits a first ping request to the peripheral device over the WLAN link during the sleep state, the first ping request including a first transmission control protocol/internet protocol (TCP/IP) frame and a first Bluetooth header encapsulated within a first WLAN-compliant packet. If the wireless device detects a response at 1304, then at 1306, the wireless device receives a ping response from the peripheral device over the WLAN link during the sleep state, the ping response being responsive to the first ping request and including a second TCP/IP frame and a second Bluetooth header encapsulated within a second WLAN-compliant packet. Conversely, if the wireless device does not detect a response at 1304, then at 1308, the wireless device transmits a second ping request to the peripheral device over the WLAN link during the sleep state based on an absence of a ping response from the peripheral device, the second ping request including a third TCP/IP frame and a third Bluetooth header encapsulated within a third WLAN-compliant packet. In some instances, the transmission of the second ping request is offset in time from the transmission of the first ping request by the sleep state beacon interval.

Figure 14:
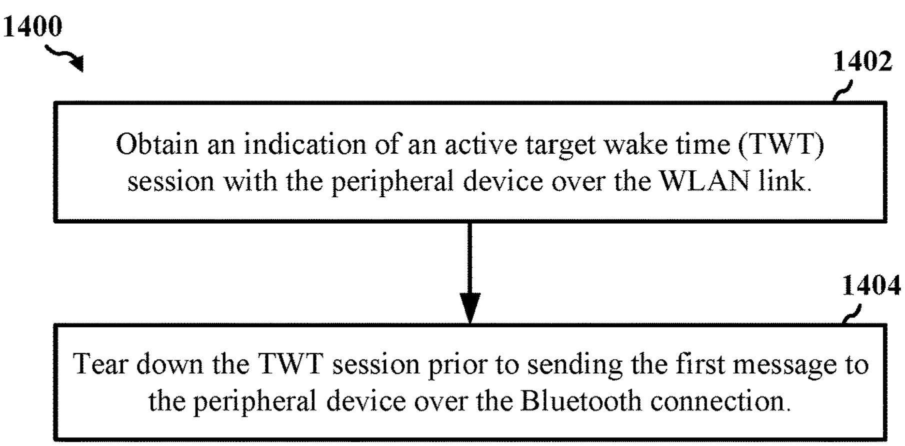
FIG. 14 shows a flowchart illustrating an example operation for wireless communication that supports a wireless device tearing down a TWT session with a peripheral device, according to various aspects of the present disclosure.

FIG. 14 shows a flowchart illustrating an example operation 1400 for wireless communication that supports a wireless device tearing down a TWT session with a peripheral device, according to various aspects of the present disclosure. In some instances, the operation 1400 may be performed prior to sending the first message at 1112 of FIG. 11. For example, at 1402, the wireless device obtains an indication of an active target wake time (TWT) session with the peripheral device over the WLAN link. At 1404, the wireless device tears down the TWT session prior to sending the first message to the peripheral device over the Bluetooth connection.

Figure 15:
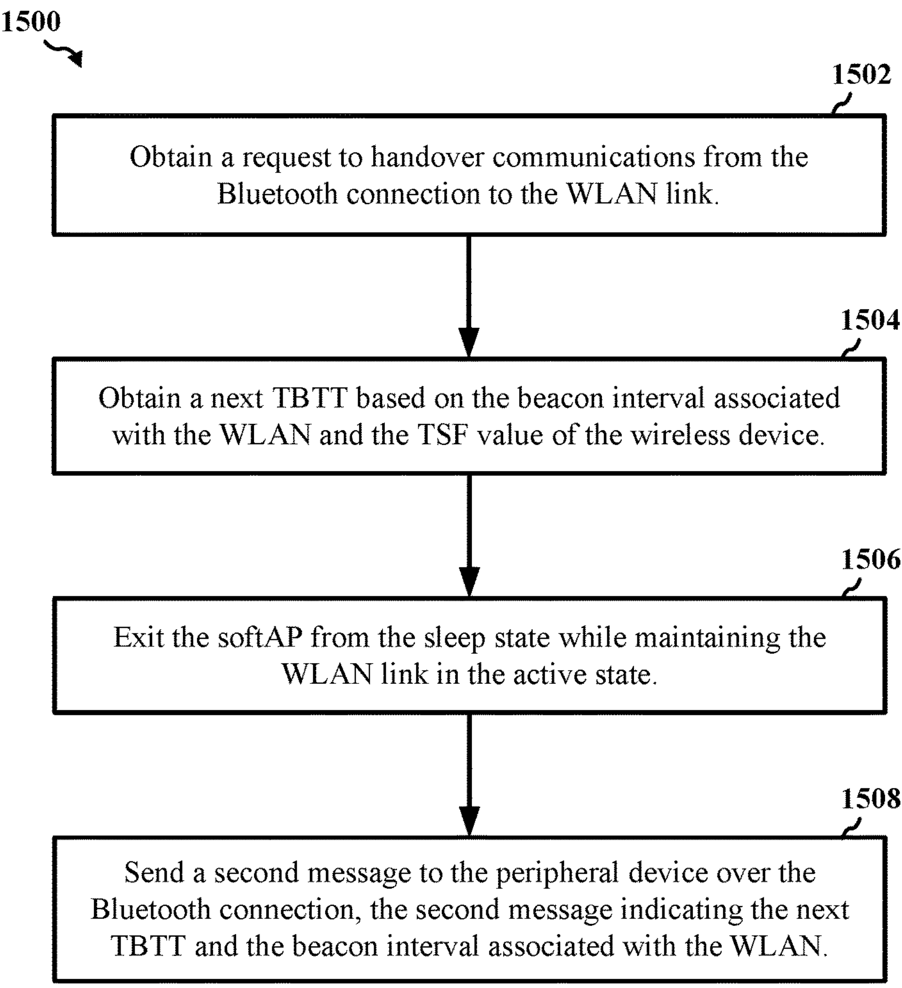
FIG. 15 shows a flowchart illustrating another example operation for wireless communication that supports a wireless device and a peripheral device exiting a sleep state, according to various aspects of the present disclosure.

FIG. 15 shows a flowchart illustrating an example operation 1500 for wireless communication that supports a wireless device and a peripheral device exiting a sleep state, according to various aspects of the present disclosure. In some instances, the operation 1500 may be performed after the example operation 1100 of FIG. 11. For example, at 1502, the wireless device obtains a request to handover communications from the Bluetooth connection to the WLAN link. At 1504, the wireless device obtains a next TBTT based on the beacon interval associated with the WLAN and the TSF value of the wireless device. At 1506, the wireless device exits the softAP from the sleep state. At 1508, the wireless device sends a second message to the peripheral device over the Bluetooth connection, the second message indicating the next TBTT and the beacon interval associated with the WLAN.

Figure 16:
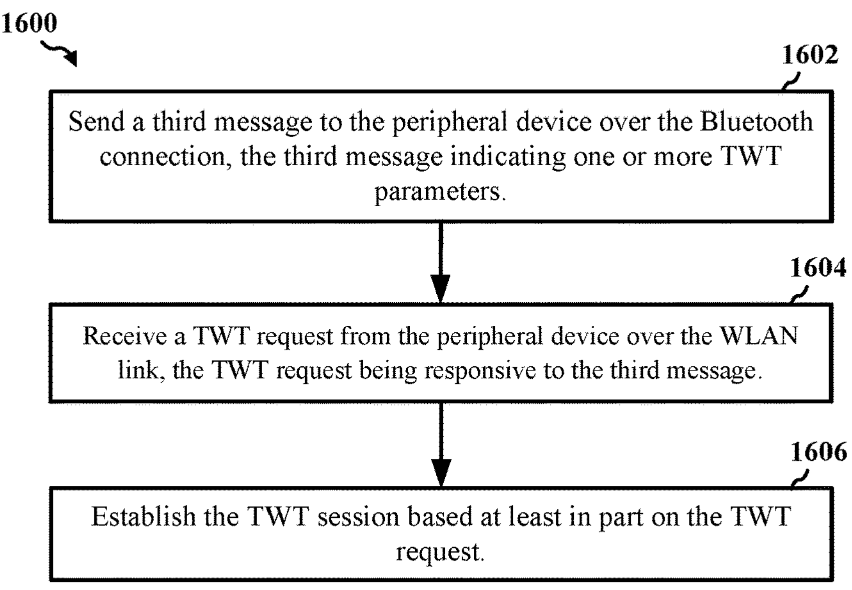
FIG. 16 shows a flowchart illustrating an example operation for wireless communication that supports a wireless device establishing a TWT session with a peripheral device, according to various aspects of the present disclosure.

FIG. 16 shows a flowchart illustrating an example operation 1600 for wireless communication that supports a wireless device establishing a TWT session with a peripheral device, according to various aspects of the present disclosure. In some instances, the operation 1600 may be performed after the example operation 1500 of FIG. 15. For example, at 1602, the wireless device sends a third message to the peripheral device over the Bluetooth connection, the third message indicating one or more TWT parameters. At 1604, the wireless device receives a TWT request from the peripheral device over the WLAN link, the TWT request being responsive to the third message. At 1606, the wireless device establishes the TWT session based at least in part on the TWT request.

Figure 17:
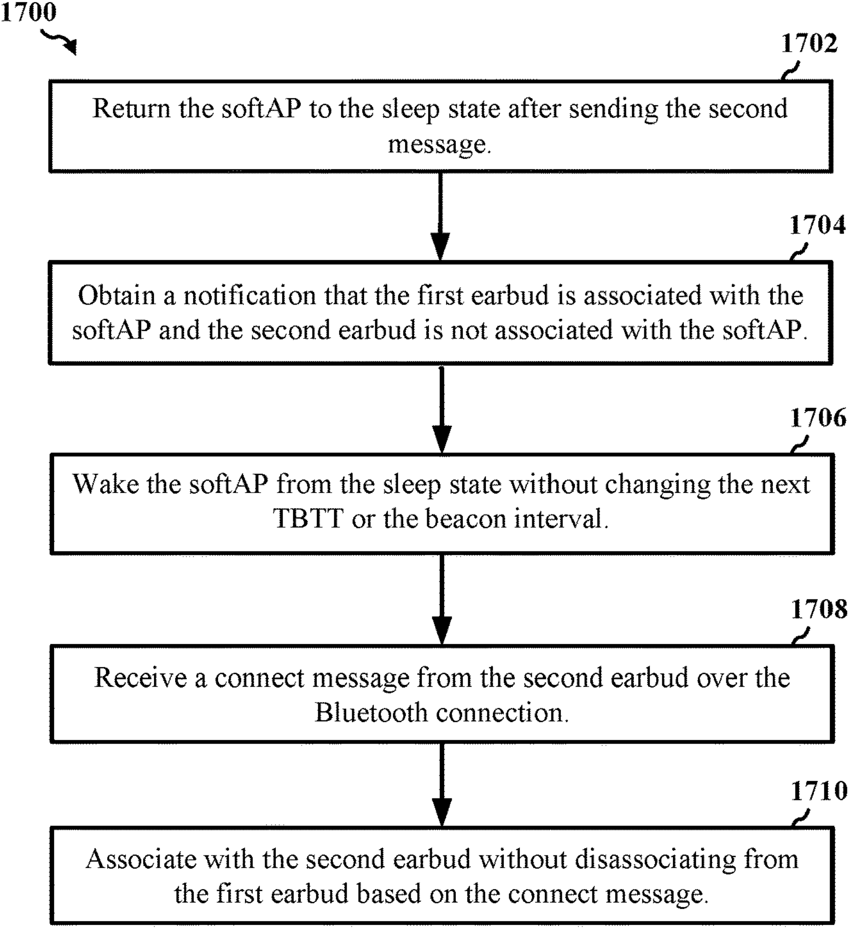
FIG. 17 shows a flowchart illustrating an example operation for wireless communication that supports a wireless device receiving a connection request from a peripheral device while in a sleep state, according to various aspects of the present disclosure.

FIG. 17 shows a flowchart illustrating an example operation 1700 for wireless communication that supports a wireless device receiving a connection request from a peripheral device while in a sleep state, according to various aspects of the present disclosure. In some instances, the operation 1700 may be performed after the example operation 1500 of FIG. 15. For example, at 1702, the wireless device returns the softAP to the sleep state after sending the second message. At 1704, the wireless device obtains a notification that the first earbud is associated with the softAP and the second earbud is not associated with the softAP. At 1706, the wireless device wakes the softAP from the sleep state without changing the next TBTT or the beacon interval. At 1708, the wireless device receives a connect message from the second earbud over the Bluetooth connection. At 1710, the wireless device associates with the second earbud without disassociating from the first earbud based at least in part on the connect message. In some instances, the notification is obtained from the first earbud over the Bluetooth connection.

Figure 18:
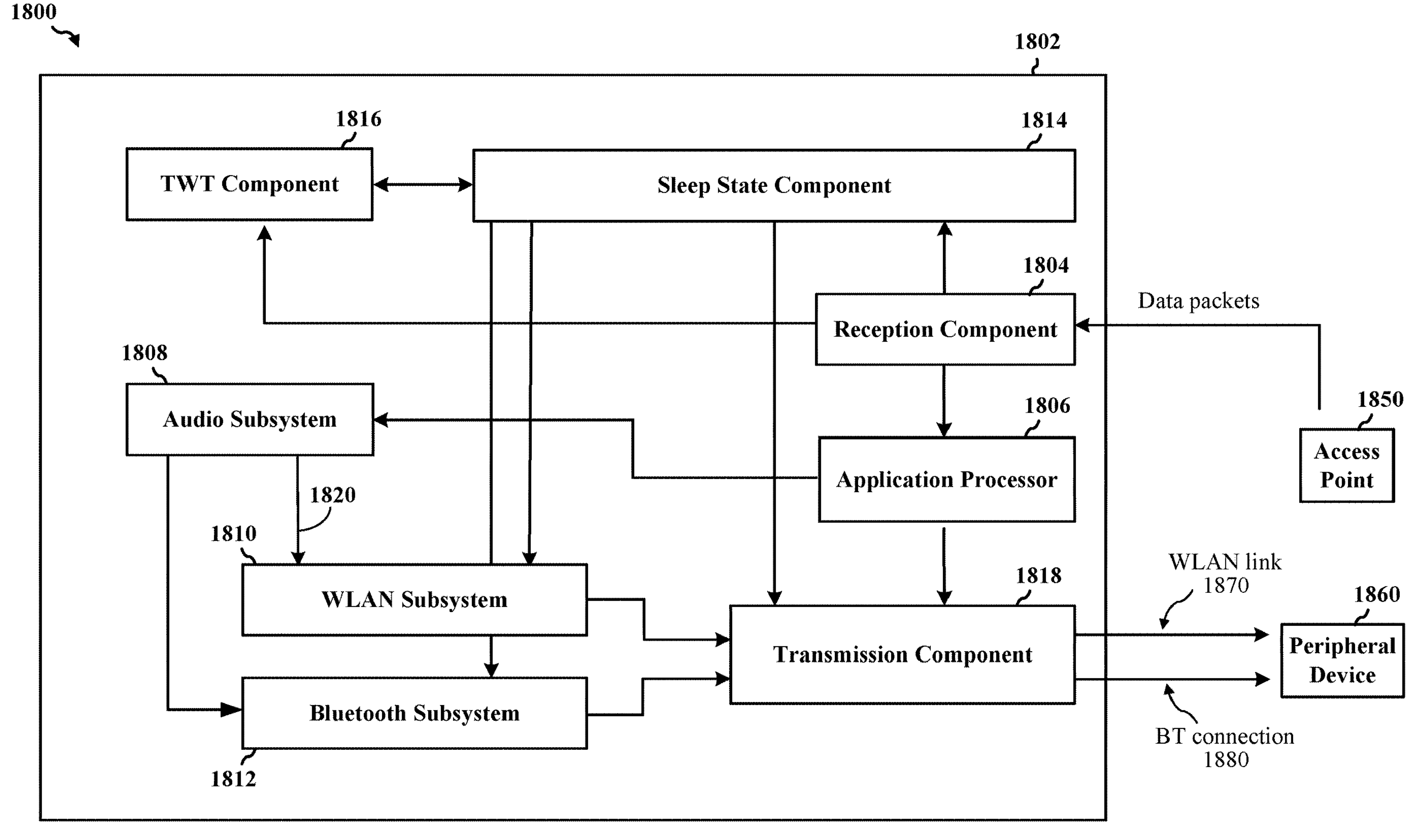
FIG. 18 shows a conceptual data flow diagram illustrating the data flow between different means/components in an example apparatus.

FIG. 18 is a conceptual data flow diagram 1800 illustrating the data flow between different means and/or components of an example apparatus 1802. In some implementations, the apparatus may be a wireless device that operates as a STA associated with a WLAN while also operating as a softAP associated with a peripheral device 1860. The apparatus 1802 includes a reception component 1804 that receives data packets from another wireless communication device (such as an AP associated with the WLAN). The apparatus 1802 also includes an application processor 1806, an audio subsystem 1808, a WLAN subsystem 1810, a Bluetooth subsystem 1812, a sleep state component 1814, a TWT component 1816, and a transmission component 1818.

The application processor 1806 extracts audio data from the data packets received from the AP 1850, attaches or applies a Bluetooth profile to the extracted audio data, and routes the extracted audio data to the audio subsystem 1808. The audio subsystem 1808 encodes the audio data, and routes the encoded audio data to the WLAN subsystem 1810 via the direct link 1820. As discussed, the direct link 1820 allows the encoded audio data to be routed directly to the WLAN subsystem 1810 without going through the application processor 1806 and without accessing the TCP/IP stack within or associated with the application processor 1806, thereby avoiding latencies associated with the application processor 1806 and the TCP/IP stack, respectively. The WLAN subsystem 1810 embeds the encoded audio data into Ethernet frames of the new Ethertype, and encapsulates the new Ethertype frames within one or more IEEE 802.11-compliant data packets. The Bluetooth subsystem 1812 can establish a Bluetooth session or connection with the peripheral device, and can facilitate the transmission of data and other information to the peripheral device 1860 using Bluetooth communications (e.g., as one or more Bluetooth frames or packets).

The transmission component 1818 is coupled to the WLAN subsystem 1810 and the Bluetooth subsystem 1812, may be used to transmit frames or packets provided by the WLAN subsystem 1810 and/or the Bluetooth subsystem 1812 to other wireless communication devices. Specifically, the transmission component 1818 may be used to transmit WLAN frames or packets provided by the WLAN subsystem 1810 to the AP 1850 over one or more WLAN channels, and may be used to transmit Bluetooth frames or packets provided by the Bluetooth subsystem 1812 to the peripheral device 1860 over the Bluetooth connection 1880. In some implementations, the transmission component 1818 may be used to transmit Bluetooth frames to the AP 1850 over one or more WLAN channels, and may be used to transmit Bluetooth frames or packets provided by the Bluetooth subsystem 1812 to the peripheral device 1860 over the Bluetooth connection 1880.

WLAN frames or packets provided by the WLAN subsystem 1810 to one or more other wireless communication devices over a WLAN channel, and may be used to transmit Bluetooth frames or packets provided by the Bluetooth subsystem 1812 to the peripheral device 1860 over the Bluetooth connection 1880.

In some implementations, the transmission component 1818 may transmit data packets containing encoded audio data embedded in the new Ethertype frames over a Wi-Fi link or channel to the peripheral device 1860. In some instances, the transmission component 1814 may transmit data to the peripheral device 1860 over a Bluetooth link or connection. In some other instances, various aspects of the transmission component 1814 may be integrated within each of the WLAN subsystem 1810 and the Bluetooth subsystem 1812.

The sleep state component 1814 may be used to enter the apparatus 1802 and the peripheral device 1860 into a sleep state, for example, based on a request to handover communications from the WLAN link to the Bluetooth connection.

The TWT component 1816 may be used to enter the apparatus 1802 and the peripheral device 1860 into a sleep state, for example, based on a request to handover communications from the WLAN link to the Bluetooth connection.

The apparatus 1802 may include additional components that perform each of the blocks of the algorithm in the flowcharts of FIGS. 11-17. As such, each block in the flowcharts of FIGS. 11-17 may be performed by a component, and the apparatus 1802 may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 19:
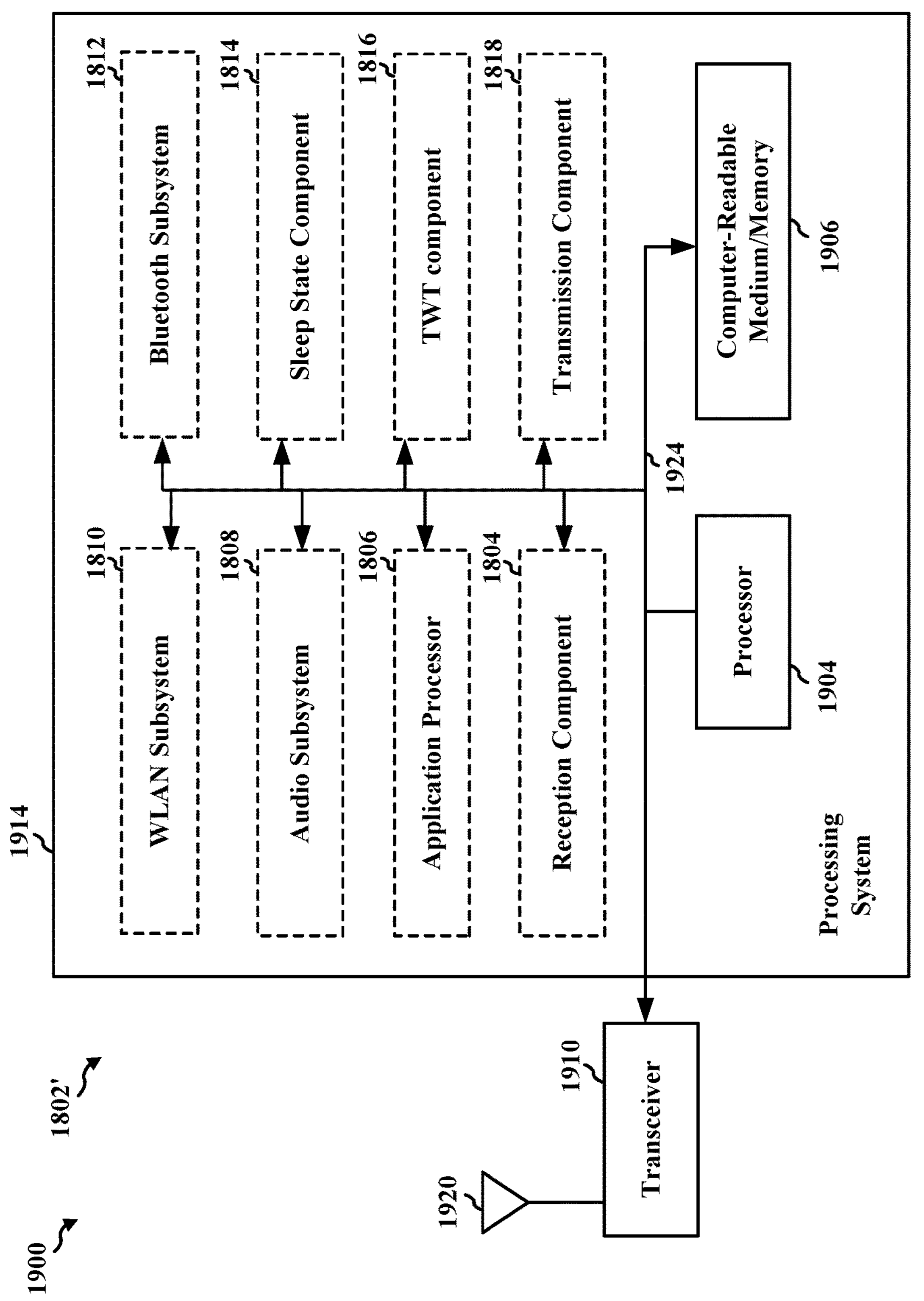
FIG. 19 shows a diagram illustrating an example of a hardware implementation for an apparatus employing a processing system.

FIG. 19 is a diagram 1900 illustrating an example of a hardware implementation for an apparatus 1802' employing a processing system 1914. The processing system 1914 may be implemented with a bus architecture, represented generally by the bus 1924. The bus 1924 may include any number of interconnecting buses and bridges depending on the specific application of the processing system 1914 and the overall design constraints. The bus 1924 links together various circuits including one or more processors and/or hardware components, represented by the processor 1904, the components 1804, 1806, 1808, 1810, 1812, 1814, 1816, and 1818 and the computer-readable medium/memory 1906. The bus 1924 may also link various other circuits such as timing sources, peripherals, voltage regulators, and power management circuits, which are well known in the art, and therefore, will not be described any further.

The processing system 1914 may be coupled to a transceiver 1910. The transceiver 1910 is coupled to one or more antennas 1920. The transceiver 1910 provides a means for communicating with various other apparatus over a transmission medium. The transceiver 1910 receives a signal from the one or more antennas 1920, extracts information from the received signal, and provides the extracted information to the processing system 1914, specifically the reception component 1804. In addition, the transceiver 1910 receives information from the processing system 1914, specifically the transmission component 1818, and based on the received information, generates a signal to be applied to the one or more antennas 1920. The processing system 1914 includes a processor 1904 coupled to a computer-readable medium/memory 1906. The processor 1904 is responsible for general processing, including the execution of software stored on the computer-readable medium/memory 1906. The software, when executed by the processor 1904, causes the processing system 1914 to perform the various functions described supra for any particular apparatus. The computer-readable medium/memory 1906 may also be used for storing data that is manipulated by the processor 1904 when executing software. The processing system 1914 further includes at least one of the components 1804, 1806, 1808, 1810, 1812, and 1818. The components may be software components running in the processor 1904, resident/stored in the computer readable medium/memory 1906, one or more hardware components coupled to the processor 1904, or some combination thereof.

In certain configurations, the apparatus 1802/1802' for wireless communication may include means for all means limitations described herein. The aforementioned means may be the processor(s) 202, the radio 230, the MMU 240, the WLAN controller 250, the Bluetooth controller 252, the WWAN controller 256, one or more of the aforementioned components of the apparatus 1802 and/or the processing system 1914 of the apparatus 1802' configured to perform the functions recited by the aforementioned means.

In one configuration, the apparatus 1902/1902' for wireless communication includes means for transmitting, to a Bluetooth-enabled peripheral device over a contention-based communication link, one or more first data packets based on a set of transmission parameters; means for receiving, from the Bluetooth-enabled peripheral device, a buffer status report (BSR) carrying feedback information indicating one or more of a quantity of data packets queued in a receive buffer of the peripheral device, a rate at which the data packets are queued in the receive buffer, and time-of-arrival (TOA) information of the data packets queued in the receive buffer; means for adjusting the set of transmission parameters based on the feedback information; and means for transmitting, to the Bluetooth-enabled peripheral device over the contention-based communication link, one or more second data packets based on the adjusted set of transmission parameters. The aforementioned means may be one or more of the aforementioned components of the apparatus 1902 and/or the processing system 1914 of the apparatus 1802' configured to perform the functions recited by the aforementioned means. As described supra, the processing system 1914 may include the processors 202, the memory 206, the flash memory 210, and/or the ROM 208 of FIG. 2.

Implementation examples are described in the following numbered clauses:

1. A method of wireless communication by a wireless device, the method including:

operating the wireless device as a wireless station (STA) associated with a wireless local area network (WLAN) while also operating the wireless device as a software-enabled access point (softAP) that is paired with a peripheral device over a Bluetooth connection and associated with the peripheral device via a WLAN link;

obtaining a request to handover communications from the WLAN link to the Bluetooth connection;

selecting a sleep state beacon interval based on the handover request, the sleep state beacon interval being longer than a beacon interval associated with the WLAN;

obtaining a next sleep state target beacon transmission time (TTBT) based on the sleep state beacon interval and a timing synchronization function (TSF) value of the wireless device;

entering the softAP into a sleep state while maintaining the WLAN link in an active state;

sending a first message to the peripheral device over the Bluetooth connection, the first message indicating the next sleep state TBTT and the sleep state beacon interval; and transmitting one or more beacon frames to the peripheral device over the WLAN link during the sleep state based on the next sleep state TBTT and the sleep state beacon interval.

2. The method of clause 1, where the peripheral device includes a first earbud and a second earbud, each of the first earbud and the second earbud being associated with the softAP, and each of the first earbud and the second earbud being paired with the softAP via the Bluetooth connection.

3. The method of any one or more of clauses 1-2, where the sleep state beacon interval is an order of magnitude longer than the beacon interval associated with the WLAN.

4. The method of any one or more of clauses 1-3, where the WLAN link includes one or more wireless channels in a 2.4 GHz frequency band, a 5 GHz frequency band, or a 6 GHz frequency band.

5. The method of any one or more of clauses 1-4, where the WLAN link includes at least one of a peer-to-peer (P2P) link, a tunneled direct-link setup (TDLS) link, a Wi-Fi Direct link, a link associated with a Group Owner (GO), or a link associated with a Neighborhood Area Network (NAN).

6. The method of any one or more of clauses 1-5, further including:

receiving one or more null frames from the peripheral device over the WLAN link, each null frame being responsive to a respective beacon frame.

7. The method of clause 6, where each beacon frame includes a traffic indication map (TIM) bit set to 1, and each null frame includes a power management (PM) bit set to 0.

8. The method of any one or more of clauses 1-7, further including:

transmitting a first ping request to the peripheral device over the WLAN link during the sleep state, the first ping request including a first transmission control protocol/internet protocol (TCP/IP) frame and a first Bluetooth header encapsulated within a first WLAN-compliant packet.

9. The method of clause 8, further including:

receiving a ping response from the peripheral device over the WLAN link during the sleep state, the ping response being responsive to the first ping request and including a second TCP/IP frame and a second Bluetooth header encapsulated within a second WLAN-compliant packet.

10. The method of clause 8, further including:

transmitting a second ping request to the peripheral device over the WLAN link during the sleep state based on an absence of a ping response from the peripheral device, the second ping request including a third TCP/IP frame and a third Bluetooth header encapsulated within a third WLAN-compliant packet.

11. The method of clause 10, where the transmission of the second ping request is offset in time from the transmission of the first ping request by the sleep state beacon interval.

12. The method of any one or more of clauses 1-11, further including:

obtaining an indication of an active target wake time (TWT) session with the peripheral device over the WLAN link; and tearing down the TWT session prior to sending the first message to the peripheral device over the Bluetooth connection.

13. The method of any one or more of clauses 1-12, further including:

obtaining a request to handover communications from the Bluetooth connection to the WLAN link;

obtaining a next TBTT based on the beacon interval associated with the WLAN and the TSF value of the wireless device;

exiting the softAP from the sleep state; and sending a second message to the peripheral device over the Bluetooth connection, the second message indicating the next TBTT and the beacon interval associated with the WLAN.

14. The method of clause 13, further including:

sending a third message to the peripheral device over the Bluetooth connection, the third message indicating one or more target wake time (TWT) parameters;

receiving a TWT request from the peripheral device over the WLAN link, the TWT request being responsive to the third message; and establishing a TWT session based at least in part on the TWT request.

15. The method of any one or more of clauses 13-14, where the peripheral device includes a first earbud and a second earbud, the method further including:

returning the softAP to the sleep state after sending the second message;

obtaining a notification that the first earbud is associated with the softAP and the second earbud is not associated with the softAP;

waking the softAP from the sleep state without changing the next TBTT or the beacon interval;

receiving a connect message from the second earbud over the Bluetooth connection; and associating with the second earbud without disassociating from the first earbud based at least in part on the connect message.

16. The method of clause 15, where the notification is obtained from the first earbud over the Bluetooth connection.

17. A wireless device, including:

one or more processors; and a memory coupled to the one or more processors and storing processor-readable code that, when executed by the one or more processors, is configured to:

operate the wireless device as a wireless station (STA) associated with a wireless local area network (WLAN) while also operating the wireless device as a software-enabled access point (softAP) that is paired with a peripheral device over a Bluetooth connection and associated with the peripheral device via a WLAN link;

obtain a request to handover communications from the WLAN link to the Bluetooth connection;

select a sleep state beacon interval based on the handover request, the sleep state beacon interval being longer than a beacon interval associated with the WLAN;

obtain a next sleep state target beacon transmission time (TTBT) based on the sleep state beacon interval and a timing synchronization function (TSF) value of the wireless device;

enter the softAP into a sleep state while maintaining the WLAN link in an active state;

send a first message to the peripheral device over the Bluetooth connection, the first message indicating the next sleep state TBTT and the sleep state beacon interval; and transmit one or more beacon frames to the peripheral device over the WLAN link during the sleep state based on the next sleep state TBTT and the sleep state beacon interval.

18. The wireless device of clause 17, where the peripheral device includes a first earbud and a second earbud, each of the first earbud and the second earbud being associated with the softAP, and each of the first earbud and the second earbud being paired with the softAP via the Bluetooth connection.

19. The wireless device of any one or more of clauses 17-18, where the sleep state beacon interval is an order of magnitude longer than the beacon interval associated with the WLAN.

20. The wireless device of any one or more of clauses 17-19, where the WLAN link includes one or more wireless channels in a 2.4 GHz frequency band, a 5 GHz frequency band, or a 6 GHz frequency band.

21. The wireless device of any one or more of clauses 17-20, where the WLAN link includes at least one of a peer-to-peer (P2P) link, a tunneled direct-link setup (TDLS) link, a Wi-Fi Direct link, a link associated with a Group Owner (GO), or a link associated with a Neighborhood Area Network (NAN).

22. The wireless device of any one or more of clauses 17-21, where execution of the processor-readable code by the one or more processors is further configured to:

receive one or more null frames from the peripheral device over the Bluetooth connection, each null frame being responsive to a respective beacon frame.

23. The wireless device of clause 22, where each beacon frame includes a traffic indication map (TIM) bit set to 1, and each null frame includes a power management (PM) bit set to 0.

24. The wireless device of any one or more of clauses 17-23, where execution of the processor-readable code by the one or more processors is further configured to:

transmit a first ping request to the peripheral device over the WLAN link during the sleep state, the first ping request including a first transmission control protocol/internet protocol (TCP/IP) frame and a first Bluetooth header encapsulated within a first WLAN-compliant packet.

25. The wireless device of clause 24, where execution of the processor-readable code by the one or more processors is further configured to:

receive a ping response from the peripheral device over the WLAN link during the sleep state, the ping response being responsive to the first ping request and including a second TCP/IP frame and a second Bluetooth header encapsulated within a second WLAN-compliant packet.

26. The wireless device of clause 24, where execution of the processor-readable code by the one or more processors is further configured to:

transmit a second ping request to the peripheral device over the WLAN link during the sleep state based on an absence of a ping response from the peripheral device, the second ping request including a third TCP/IP frame and a third Bluetooth header encapsulated within a third WLAN-compliant packet.

27. The wireless device of clause 26, where the transmission of the second ping request is offset in time from the transmission of the first ping request by the sleep state beacon interval.

28. The wireless device of any one or more of clauses 17-27, where execution of the processor-readable code by the one or more processors is further configured to:

obtain an indication of an active target wake time (TWT) session with the peripheral device over the WLAN link; and tear down the TWT session prior to sending the first message to the peripheral device over the Bluetooth connection.

29. The wireless device of any one or more of clauses 17-28, where execution of the processor-readable code by the one or more processors is further configured to:

obtain a request to handover communications from the Bluetooth connection to the WLAN link;

obtain a next TBTT based on the beacon interval associated with the WLAN and the TSF value of the wireless device;

exit the softAP from the sleep state; and send a second message to the peripheral device over the Bluetooth connection, the second message indicating the next TBTT and the beacon interval associated with the WLAN.

30. The wireless device of clause 29, where execution of the processor-readable code by the one or more processors is further configured to:

send a third message to the peripheral device over the Bluetooth connection, the third message indicating one or more target wake time (TWT) parameters;

receive a TWT request from the peripheral device over the WLAN link, the TWT request being responsive to the third message; and establish a TWT session based at least in part on the TWT request.

31. The wireless device of any one or more of clauses 29-30, where the peripheral device includes a first earbud and a second earbud, where execution of the processor-readable code by the one or more processors is further configured to:

return the softAP to the sleep state after sending the second message;

obtain a notification that the first earbud is associated with the softAP and the second earbud is not associated with the softAP;

wake the softAP from the sleep state without changing the next TBTT or the beacon interval;

receive a connect message from the second earbud over the Bluetooth connection; and associate with the second earbud without disassociating from the first earbud based at least in part on the connect message.

32. The wireless device of clause 31, where the notification is obtained from the first earbud over the Bluetooth connection.

As used herein, a phrase referring to "at least one of" or "one or more of" a list of items refers to any combination of those items, including single members. For example, "at least one of: a, b, or c" is intended to cover the possibilities of: a only, b only, c only, a combination of a and b, a combination of a and c, a combination of b and c, and a combination of a and b and c.

The various illustrative components, logic, logical blocks, modules, circuits, operations, and algorithm processes described in connection with the implementations disclosed herein may be implemented as electronic hardware, firmware, software, or combinations of hardware, firmware, or software, including the structures disclosed in this specification and the structural equivalents thereof. The interchangeability of hardware, firmware and software has been described generally, in terms of functionality, and illustrated in the various illustrative components, blocks, modules, circuits and processes described herein. Whether such functionality is implemented in hardware, firmware or software depends upon the particular application and design constraints imposed on the overall system.

Various modifications to the implementations described in this disclosure may be readily apparent to persons having ordinary skill in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Additionally, various features that are described in this specification in the context of separate implementations also can be implemented in combination in a single implementation. Conversely, various features that are described in the context of a single implementation also can be implemented in multiple implementations separately or in any suitable subcombination. As such, although features may be described herein as acting in particular combinations, and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flowchart or flow diagram. However, other operations that are not depicted can be incorporated in the example processes that are schematically illustrated. For example, one or more additional operations can be performed before, after, simultaneously, or between any of the illustrated operations. In some circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products.

What is claimed is:

1. A method of wireless communication by a wireless device, the method comprising:

operating the wireless device as a wireless station (STA) associated with a wireless local area network (WLAN) while also operating the wireless device as a software-enabled access point (softAP) that is paired with a peripheral device over a Bluetooth connection and associated with the peripheral device via a WLAN link;

obtaining a request to handover communications from the WLAN link to the Bluetooth connection;

selecting a sleep state beacon interval based on the handover request, the sleep state beacon interval being longer than a beacon interval associated with the WLAN;

obtaining a next sleep state target beacon transmission time (TTBT) based on the sleep state beacon interval and a timing synchronization function (TSF) value of the wireless device;

entering the softAP into a sleep state while maintaining the WLAN link in an active state;

sending a first message to the peripheral device over the Bluetooth connection, the first message indicating the next sleep state TBTT and the sleep state beacon interval; and transmitting one or more beacon frames to the peripheral device over the WLAN link during the sleep state based on the next sleep state TBTT and the sleep state beacon interval.

2. The method of claim 1, wherein the peripheral device includes a first earbud and a second earbud, each of the first earbud and the second earbud being associated with the softAP, and each of the first earbud and the second earbud being paired with the softAP via the Bluetooth connection.

3. The method of claim 1, wherein the sleep state beacon interval is an order of magnitude longer than the beacon interval associated with the WLAN.

4. The method of claim 1, wherein the WLAN link comprises one or more wireless channels in a 2.4 GHz frequency band, a 5 GHz frequency band, or a 6 GHz frequency band.

5. The method of claim 1, wherein the WLAN link comprises at least one of a peer-to-peer (P2P) link, a tunneled direct-link setup (TDLS) link, a Wi-Fi Direct link, a link associated with a Group Owner (GO), or a link associated with a Neighborhood Area Network (NAN).

6. The method of claim 1, further comprising:
receiving one or more null frames from the peripheral device over the WLAN link, each null frame being responsive to a respective beacon frame.

7. The method of claim 6, wherein each beacon frame includes a traffic indication map (TIM) bit set to 1, and each null frame includes a power management (PM) bit set to 0.

8. The method of claim 1, further comprising:
transmitting a first ping request to the peripheral device over the WLAN link during the sleep state, the first ping request comprising a first transmission control protocol/internet protocol (TCP/IP) frame and a first Bluetooth header encapsulated within a first WLAN-compliant packet.

9. The method of claim 8, further comprising:
receiving a ping response from the peripheral device over the WLAN link during the sleep state, the ping response being responsive to the first ping request and comprising a second TCP/IP frame and a second Bluetooth header encapsulated within a second WLAN-compliant packet.

10. The method of claim 8, further comprising:
transmitting a second ping request to the peripheral device over the WLAN link during the sleep state based on an absence of a ping response from the peripheral device, the second ping request comprising a third TCP/IP frame and a third Bluetooth header encapsulated within a third WLAN-compliant packet.

11. The method of claim 10, wherein the transmission of the second ping request is offset in time from the transmission of the first ping request by the sleep state beacon interval.

12. The method of claim 1, further comprising:
obtaining an indication of an active target wake time (TWT) session with the peripheral device over the WLAN link; and
tearing down the TWT session prior to sending the first message to the peripheral device over the Bluetooth connection.

13. The method of claim 1, further comprising:
obtaining a request to handover communications from the Bluetooth connection to the WLAN link;
obtaining a next TBTT based on the beacon interval associated with the WLAN and the TSF value of the wireless device;
exiting the softAP from the sleep state; and
sending a second message to the peripheral device over the Bluetooth connection, the second message indicating the next TBTT and the beacon interval associated with the WLAN.

14. The method of claim 13, further comprising:
sending a third message to the peripheral device over the Bluetooth connection, the third message indicating one or more target wake time (TWT) parameters;
receiving a TWT request from the peripheral device over the WLAN link, the TWT request being responsive to the third message; and
establishing a TWT session based at least in part on the TWT request.

15. The method of claim 13, wherein the peripheral device includes a first earbud and a second earbud, the method further comprising:
returning the softAP to the sleep state after sending the second message;
obtaining a notification that the first earbud is associated with the softAP and the second earbud is not associated with the softAP;
waking the softAP from the sleep state without changing the next TBTT or the beacon interval;
receiving a connect message from the second earbud over the Bluetooth connection; and
associating with the second earbud without disassociating from the first earbud based at least in part on the connect message.

16. The method of claim 15, wherein the notification is obtained from the first earbud over the Bluetooth connection.

17. A wireless device, comprising:
one or more processors; and
a memory coupled to the one or more processors and storing processor-readable code that, when executed by the one or more processors, is configured to:
operate the wireless device as a wireless station (STA) associated with a wireless local area network (WLAN) while also operating the wireless device as a software-enabled access point (softAP) that is paired with a peripheral device over a Bluetooth connection and associated with the peripheral device via a WLAN link;
obtain a request to handover communications from the WLAN link to the Bluetooth connection;
select a sleep state beacon interval based on the handover request, the sleep state beacon interval being longer than a beacon interval associated with the WLAN;
obtain a next sleep state target beacon transmission time (TTBT) based on the sleep state beacon interval and a timing synchronization function (TSF) value of the wireless device;
enter the softAP into a sleep state while maintaining the WLAN link in an active state;
send a first message to the peripheral device over the Bluetooth connection, the first message indicating the next sleep state TBTT and the sleep state beacon interval; and
transmit one or more beacon frames to the peripheral device over the WLAN link during the sleep state based on the next sleep state TBTT and the sleep state beacon interval.

18. The wireless device of claim 17, wherein the peripheral device comprises a first earbud and a second earbud, each of the first earbud and the second earbud being associated with the softAP, and each of the first earbud and the second earbud being paired with the softAP via the Bluetooth connection.

19. The wireless device of claim 17, wherein the sleep state beacon interval is an order of magnitude longer than the beacon interval associated with the WLAN.

20. The wireless device of claim 17, wherein the WLAN link comprises one or more wireless channels in a 2.4 GHz frequency band, a 5 GHz frequency band, or a 6 GHz frequency band.

21. The wireless device of claim 17, wherein the WLAN link comprises at least one of a peer-to-peer (P2P) link, a tunneled direct-link setup (TDLS) link, a Wi-Fi Direct link, a link associated with a Group Owner (GO), or a link associated with a Neighborhood Area Network (NAN).

22. The wireless device of claim 17, wherein execution of the processor-readable code by the one or more processors is further configured to:

receive one or more null frames from the peripheral device over the Bluetooth connection, each null frame being responsive to a respective beacon frame.

23. The wireless device of claim 22, wherein each beacon frame includes a traffic indication map (TIM) bit set to 1, and each null frame includes a power management (PM) bit set to 0.

24. The wireless device of claim 17, wherein execution of the processor-readable code by the one or more processors is further configured to:

transmit a first ping request to the peripheral device over the WLAN link during the sleep state, the first ping request comprising a first transmission control protocol/internet protocol (TCP/IP) frame and a first Bluetooth header encapsulated within a first WLAN-compliant packet.

25. The wireless device of claim 24, wherein execution of the processor-readable code by the one or more processors is further configured to:

receive a ping response from the peripheral device over the WLAN link during the sleep state, the ping response being responsive to the first ping request and comprising a second TCP/IP frame and a second Bluetooth header encapsulated within a second WLAN-compliant packet.

26. The wireless device of claim 24, wherein execution of the processor-readable code by the one or more processors is further configured to:

transmit a second ping request to the peripheral device over the WLAN link during the sleep state based on an absence of a ping response from the peripheral device, the second ping request comprising a third TCP/IP frame and a third Bluetooth header encapsulated within a third WLAN-compliant packet.

27. The wireless device of claim 26, wherein the transmission of the second ping request is offset in time from the transmission of the first ping request by the sleep state beacon interval.

28. The wireless device of claim 17, wherein execution of the processor-readable code by the one or more processors is further configured to:

obtain an indication of an active target wake time (TWT) session with the peripheral device over the WLAN link; and tear down the TWT session prior to sending the first message to the peripheral device over the Bluetooth connection.

29. The wireless device of claim 17, wherein execution of the processor-readable code by the one or more processors is further configured to:

obtain a request to handover communications from the Bluetooth connection to the WLAN link;

obtain a next TBTT based on the beacon interval associated with the WLAN and the TSF value of the wireless device;

exit the softAP from the sleep state; and send a second message to the peripheral device over the Bluetooth connection, the second message indicating the next TBTT and the beacon interval associated with the WLAN.

30. The wireless device of claim 29, wherein execution of the processor-readable code by the one or more processors is further configured to:

send a third message to the peripheral device over the Bluetooth connection, the third message indicating one or more target wake time (TWT) parameters;

receive a TWT request from the peripheral device over the WLAN link, the TWT request being responsive to the third message; and establish a TWT session based at least in part on the TWT request.

31. The wireless device of claim 29, wherein the peripheral device includes a first earbud and a second earbud, wherein execution of the processor-readable code by the one or more processors is further configured to:

return the softAP to the sleep state after sending the second message;

obtain a notification that the first earbud is associated with the softAP and the second earbud is not associated with the softAP;

wake the softAP from the sleep state without changing the next TBTT or the beacon interval;

receive a connect message from the second earbud over the Bluetooth connection; and associate with the second earbud without disassociating from the first earbud based at least in part on the connect message.

32. The wireless device of claim 31, wherein the notification is obtained from the first earbud over the Bluetooth connection.

* * * * *